United States Patent
Kim et al.

(10) Patent No.: US 10,402,695 B1
(45) Date of Patent: *Sep. 3, 2019

(54) LEARNING METHOD AND LEARNING DEVICE FOR CONVOLUTIONAL NEURAL NETWORK USING 1×H CONVOLUTION FOR IMAGE RECOGNITION TO BE USED FOR HARDWARE OPTIMIZATION, AND TESTING METHOD AND TESTING DEVICE USING THE SAME

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/255,044

(22) Filed: Jan. 23, 2019

(51) Int. Cl.
*G06K 9/62* (2006.01)
*G06N 3/08* (2006.01)
(Continued)

(52) U.S. Cl.
CPC ......... *G06K 9/6268* (2013.01); *G06K 9/6232* (2013.01); *G06T 7/11* (2017.01);
(Continued)

(58) Field of Classification Search
CPC .. G06K 9/6257; G06K 9/4642; G06K 9/6262; G06N 3/04; G06N 7/005
See application file for complete search history.

(56) References Cited

U.S. PATENT DOCUMENTS 10,169,679 B1 * 1/2019 Kim .................... G06K 9/6256
10,185,878 B2 * 1/2019 Liu .................... G06K 9/00369
(Continued)

OTHER PUBLICATIONS

Zhang, Xiangyu et al. "ShuffleNet: An Extremely Efficient Convolutional Neural Network for Mobile Devices." 2018 IEEE/CVF Conference on Computer Vision and Pattern Recognition (2018) (Year: 2018).*

(Continued)

*Primary Examiner* — Utpal D Shah
(74) *Attorney, Agent, or Firm* — Husch Blackwell LLP

(57) ABSTRACT

A method for learning parameters of a CNN for image recognition is provided to be used for hardware optimization which satisfies KPI. The method includes steps of: a learning device (a) instructing a first transposing layer or a pooling layer to generate an integrated feature map by concatenating pixels, per each ROI, on pooled ROI feature maps; (b) instructing a 1×H1 convolutional layer to generate a first adjusted feature map using a first reshaped feature map, generated by concatenating features in H1 channels of the integrated feature map, and instructing a 1×H2 convolutional layer to generate a second adjusted feature map using a second reshaped feature map, generated by concatenating features in H2 channels of the first adjusted feature map; and (c) instructing a second transposing layer or a classifying (Continued)

layer to divide the second adjusted feature map by each pixel, to thereby generate pixel-wise feature maps.

24 Claims, 11 Drawing Sheets

(51) Int. Cl.
*G06K 9/42* (2006.01)
*G06T 7/11* (2017.01)

(52) U.S. Cl.
CPC .............. *G06T 2207/20081* (2013.01); *G06T 2207/20084* (2013.01)

(56) References Cited

U.S. PATENT DOCUMENTS

| | | | |
|---|---|---|---|
| 10,223,610 B1* | 3/2019 | Akselrod-Ballin | G06K 9/6218 |
| 2016/0035078 A1* | 2/2016 | Lin | G06T 7/0002 382/157 |
| 2017/0124415 A1* | 5/2017 | Choi | G06N 3/08 |
| 2017/0147905 A1* | 5/2017 | Huang | G06K 9/6232 |
| 2017/0220904 A1* | 8/2017 | Bai | G06K 9/4604 |
| 2018/0039853 A1* | 2/2018 | Liu | G06N 3/0454 |
| 2018/0039864 A1* | 2/2018 | Yao | G06K 9/38 |
| 2018/0060701 A1* | 3/2018 | Krishnamurthy | G06K 9/6269 |
| 2018/0068198 A1* | 3/2018 | Savvides | G06K 9/3233 |
| 2018/0096457 A1* | 4/2018 | Savvides | G06K 9/6267 |
| 2018/0129906 A1* | 5/2018 | Habibian | G06K 9/4628 |
| 2018/0137350 A1* | 5/2018 | Such | G06K 9/00463 |
| 2018/0158189 A1* | 6/2018 | Yedla | G06T 7/11 |
| 2018/0165551 A1* | 6/2018 | Roh | G06K 9/3233 |
| 2018/0195977 A1* | 7/2018 | Wang | G01V 5/0016 |
| 2018/0253622 A1* | 9/2018 | Chen | G06N 3/0454 |
| 2018/0260414 A1* | 9/2018 | Gordo Soldevila | G06N 3/0445 |
| 2018/0260415 A1* | 9/2018 | Gordo Soldevila | G06K 9/4628 |
| 2018/0276454 A1* | 9/2018 | Han | G06K 9/00255 |
| 2018/0315154 A1* | 11/2018 | Park | G06T 1/20 |
| 2019/0012802 A1* | 1/2019 | Liu | G06T 7/73 |
| 2019/0015059 A1* | 1/2019 | Itu | G06F 16/285 |
| 2019/0019037 A1* | 1/2019 | Kadav | G06K 9/00744 |
| 2019/0049540 A1* | 2/2019 | Odry | G01R 33/5608 |
| 2019/0050694 A1* | 2/2019 | Fukagai | G06K 9/66 |
| 2019/0050728 A1* | 2/2019 | Sim | G06N 3/08 |
| 2019/0050981 A1* | 2/2019 | Song | G06T 7/0012 |
| 2019/0050994 A1* | 2/2019 | Fukagai | G06T 7/20 |
| 2019/0057507 A1* | 2/2019 | El-Khamy | G06T 7/11 |
| 2019/0057509 A1* | 2/2019 | Lv | G06T 7/254 |
| 2019/0065897 A1* | 2/2019 | Li | G06K 9/628 |
| 2019/0066326 A1* | 2/2019 | Tran | G06T 7/73 |
| 2019/0094858 A1* | 3/2019 | Radosavljevic | G05D 1/0088 |
| 2019/0114544 A1* | 4/2019 | Sundaram | G06K 9/6257 |
| 2019/0114743 A1* | 4/2019 | Lund | G06T 3/4046 |

OTHER PUBLICATIONS

Im, Daniel Jiwoong et al. "Generating images with recurrent adversarial networks." CoRR abs/1602.05110 (2016) (Year: 2016).*

* cited by examiner

FIG. 3
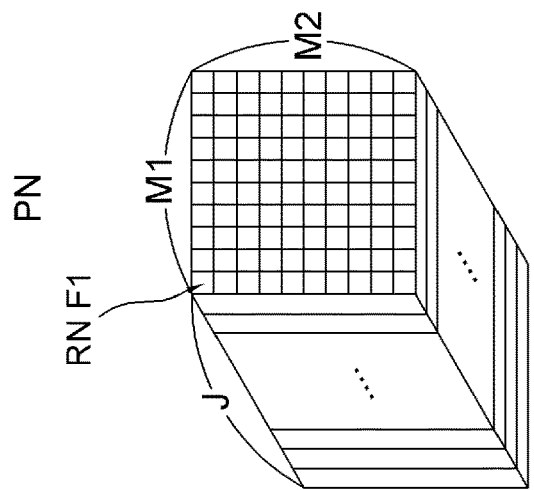
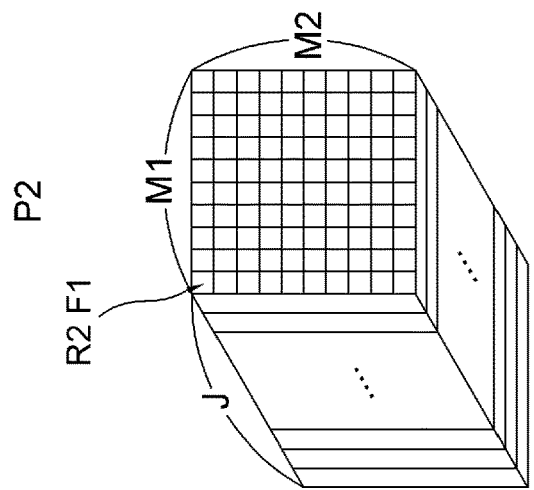
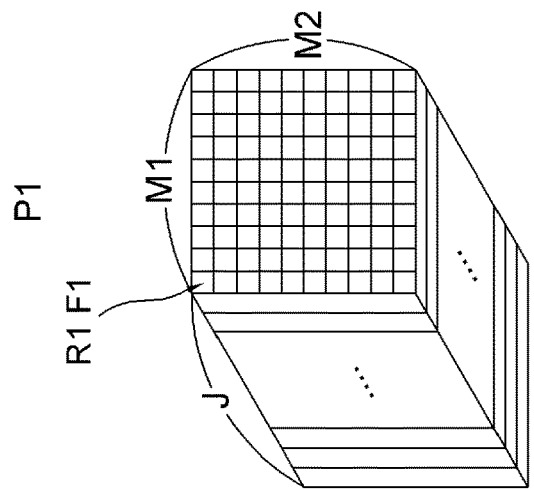

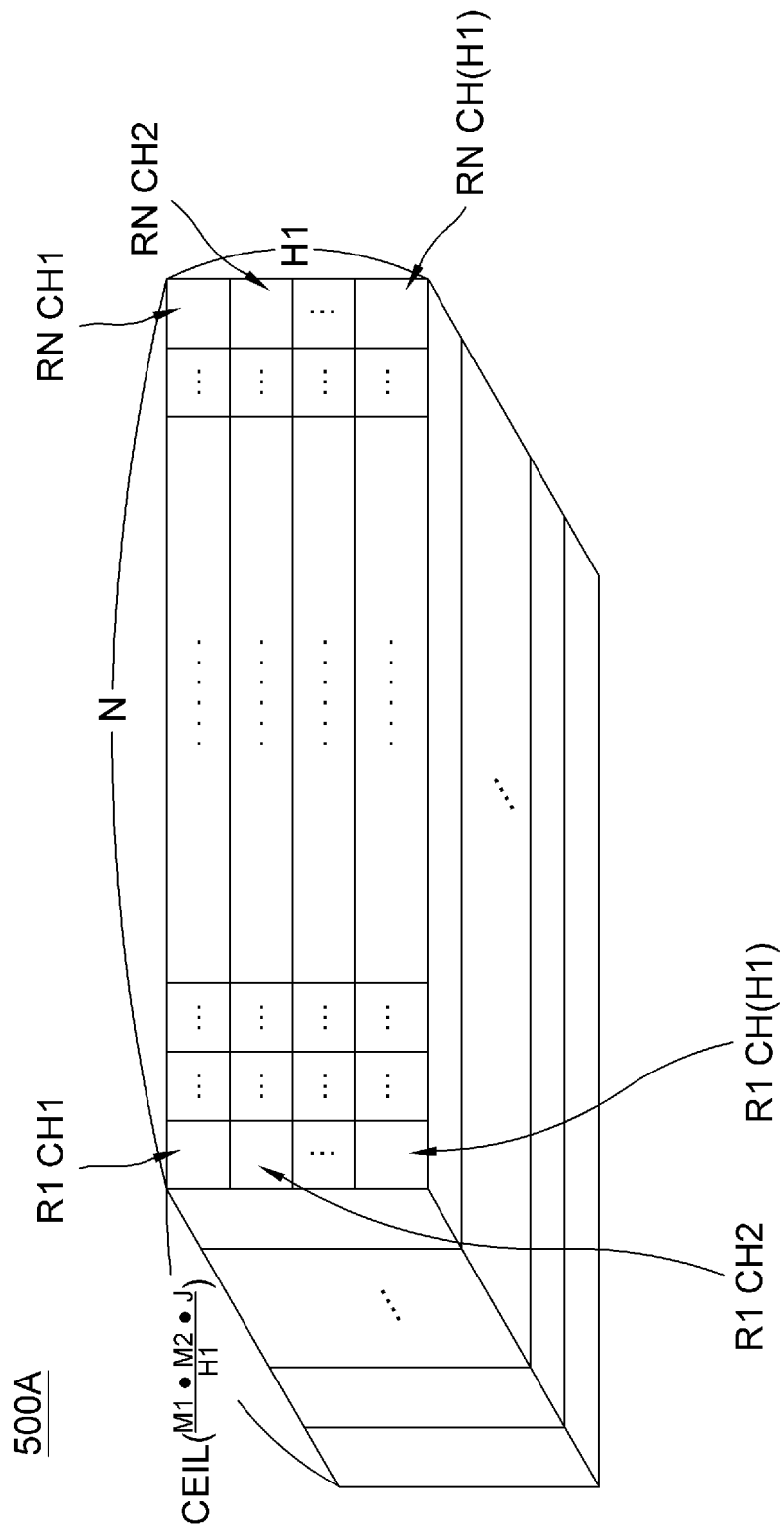

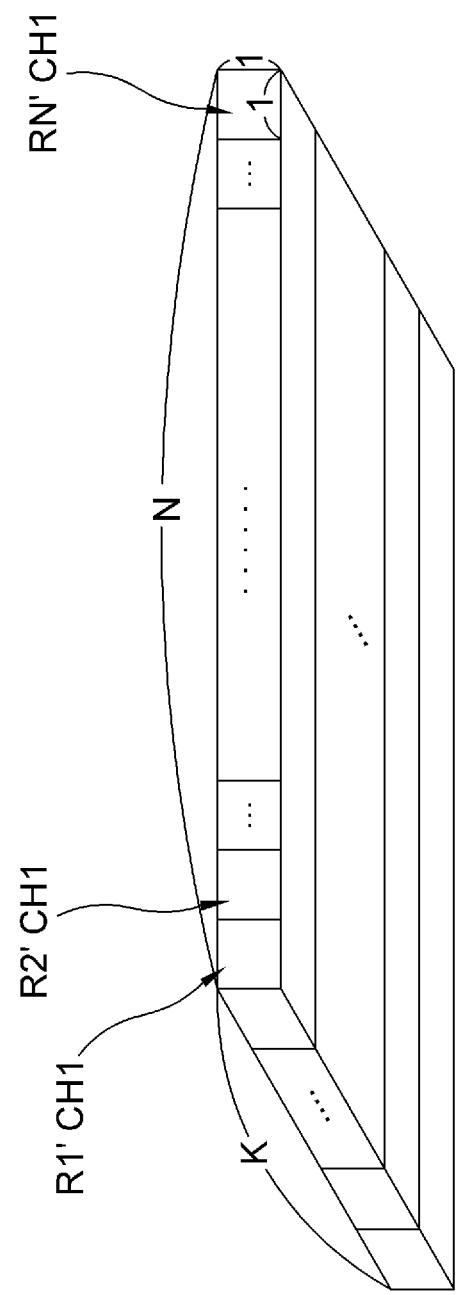

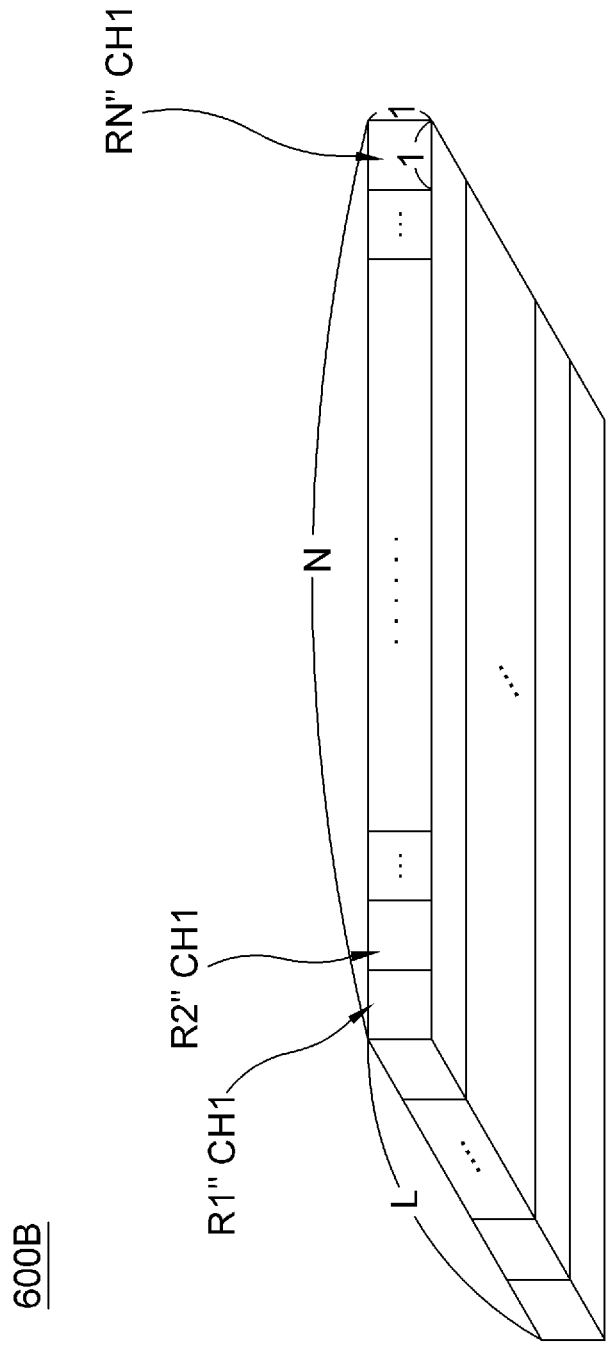

LEARNING METHOD AND LEARNING DEVICE FOR CONVOLUTIONAL NEURAL NETWORK USING 1×H CONVOLUTION FOR IMAGE RECOGNITION TO BE USED FOR HARDWARE OPTIMIZATION, AND TESTING METHOD AND TESTING DEVICE USING THE SAME

FIELD OF THE DISCLOSURE

The present disclosure relates to a method for learning CNN (convolutional neural network) for image recognition to be used for hardware optimization; and more particularly, to the method for learning the parameters of the CNN for the image recognition, including steps of: (a) if at least one training image is acquired, (i) instructing one or more convolutional layers to generate ROI feature maps per each of one or more ROIs, corresponding to one or more objects, by applying one or more convolution operations to each of ROI images generated by cropping and resizing areas of the ROIs on the training image, and (ii) (ii-1) instructing a pooling layer to apply one or more pooling operations to the ROI feature maps, to thereby generate pooled feature maps per each of the ROIs, and instructing a first transposing layer to concatenate each of pixels, per each of the ROIs, in each of corresponding same locations on the pooled feature maps per each of the ROIs, to thereby generate an integrated feature map, or (ii-2) instructing the pooling layer to apply the pooling operations to the ROI feature maps, to thereby generate the pooled feature maps per each of the ROIs, and instructing the pooling layer to concatenate each of the pixels, per each of the ROIs, in each of the corresponding same locations on the pooled feature maps per each of the ROIs, to thereby generate the integrated feature map; (b) (b1) (i) instructing a first reshaping layer to concatenate each of features in each group comprised of each corresponding H1 channels among all channels of the integrated feature map, to thereby generate a first reshaped feature map, and (ii) instructing a 1×H1 convolutional layer to apply a 1×H1 convolution operation to the first reshaped feature map, to thereby generate a first adjusted feature map whose volume is adjusted, and (b2) (i) instructing a second reshaping layer to concatenate each of features in each group comprised of each corresponding H2 channels among all channels of the first adjusted feature map, to thereby generate a second reshaped feature map, and (ii) instructing a 1×H2 convolutional layer to apply a 1×H2 convolution operation to the second reshaped feature map, to thereby generate a second adjusted feature map whose volume is adjusted; and (c) (c1) (i) instructing a second transposing layer to divide the second adjusted feature map by each of the pixels, to thereby generate pixel-wise feature maps per each of the ROIs, and instructing a classifying layer to generate object information on each of the ROIs by using the pixel-wise feature maps per each of the ROIs, or (ii) instructing the classifying layer to divide the second adjusted feature map by each of the pixels, to thereby generate the pixel-wise feature maps per each of the ROIs, and instructing the classifying layer to generate the object information on each of the ROIs by using the pixel-wise feature maps per each of the ROIs, and (c2) instructing a loss layer to calculate one or more object losses by referring to the object information and its corresponding GT, to thereby learn at least part of parameters of the 1×H2 convolutional layer, the 1×H1 convolutional layer, and the convolutional layers by backpropagating the object losses, and a learning device, a testing method, and a testing device using the same.

BACKGROUND OF THE DISCLOSURE

Deep Convolution Neural Networks (Deep CNNs) are at the heart of the remarkable development in deep learning. CNNs have already been used in the 90's to solve the problems of character recognition, but their use has become as widespread as it is now thanks to recent research. These deep CNNs won the 2012 ImageNet image classification tournament, crushing other competitors. Then, the convolutional neural network became a very useful tool in the field of the machine learning.

The CNN may include a feature extractor which extracts features from an image, and a feature classifier which detects objects in the image or recognizes the objects in the image by referring to the features extracted by the feature extractor.

The feature extractor of the CNN may include convolutional layers, and the feature classifier may include FC layers capable of applying fully connected operations to the features extracted by the feature extractor.

However, the FC layers have problems in that weights have to be generated for every feature inputted, and the fully connected operations have to be performed for every feature inputted, resulting in heavy computational load.

Further, the FC layers require a size of its input image to be same as a size preset according to an FC layer model. Therefore, if a training image or a test image having a size different from the preset size is inputted into the CNN including the FC layers, although the convolutional layers may apply their operations successfully to the training image or the test image, the FC layers cannot apply their operations to the training image or the test image, as the size of the input image is different from the preset size.

Accordingly, the inventors of the present disclosure propose the CNN for image recognition capable of overcoming the problems of the FC layers.

SUMMARY OF THE DISCLOSURE

It is an object of the present disclosure to solve all the aforementioned problems.

It is another object of the present disclosure to provide a CNN for image recognition capable of recognizing one or more objects on at least one input image without regard to a size of the input image.

It is still another object of the present disclosure to provide the CNN for image recognition capable of minimizing the number of weights used for feature classification.

It is still yet another object of the present disclosure to provide the CNN for image recognition capable of reducing amount of computation for feature classification.

In accordance with one aspect of the present disclosure, there is provided a method for learning parameters of a CNN for image recognition, including steps of: (a) a learning device, if at least one training image is acquired, (i) instructing one or more convolutional layers to generate ROI feature maps per each of one or more ROIs, corresponding to one or more objects, by applying one or more convolution operations to each of ROI images generated by cropping and resizing areas of the ROIs on the training image, and (ii) (ii-1) instructing a pooling layer to apply one or more pooling operations to the ROI feature maps, to thereby generate pooled feature maps per each of the ROIs, and instructing a first transposing layer to concatenate each of pixels, per each of the ROIs, in each of corresponding same locations on the pooled feature maps per each of the ROIs, to thereby generate an integrated feature map, or (ii-2) instructing the pooling layer to apply the pooling operations to the ROI feature maps, to thereby generate the pooled feature maps per each of the ROIs, and instructing the pooling layer to concatenate each of the pixels, per each of the ROIs, in each of the corresponding same locations on the pooled feature maps per each of the ROIs, to thereby generate the integrated feature map; (b) the learning device (b1) (i) instructing a first reshaping layer to concatenate each of features in each group comprised of each corresponding H1 channels among all channels of the integrated feature map, to thereby generate a first reshaped feature map, and (ii) instructing a 1×H1 convolutional layer to apply a 1×H1 convolution operation to the first reshaped feature map, to thereby generate a first adjusted feature map whose volume is adjusted, and (b2) (i) instructing a second reshaping layer to concatenate each of features in each group comprised of each corresponding H2 channels among all channels of the first adjusted feature map, to thereby generate a second reshaped feature map, and (ii) instructing a 1×H2 convolutional layer to apply a 1×H2 convolution operation to the second reshaped feature map, to thereby generate a second adjusted feature map whose volume is adjusted; and (c) the learning device (c1) (i) instructing a second transposing layer to divide the second adjusted feature map by each of the pixels, to thereby generate pixel-wise feature maps per each of the ROIs, and instructing a classifying layer to generate object information on each of the ROIs by using the pixel-wise feature maps per each of the ROIs, or (ii) instructing the classifying layer to divide the second adjusted feature map by each of the pixels, to thereby generate the pixel-wise feature maps per each of the ROIs, and instructing the classifying layer to generate the object information on each of the ROIs by using the pixel-wise feature maps per each of the ROIs, and (c2) instructing a loss layer to calculate one or more object losses by referring to the object information and its corresponding GT, to thereby learn at least part of parameters of the 1×H2 convolutional layer, the 1×H1 convolutional layer, and the convolutional layers by backpropagating the object losses.

As one example, at the step of (b), the learning device, if the number of channels of the integrated feature map is not a multiple of H1, instructs the first reshaping layer to add at least one first dummy channel to the integrated feature map such that the number of channels of the integrated feature map including the at least one first dummy channel is a multiple of H1, and to concatenate said each of features in said each group comprised of said each corresponding H1 channels among said all channels of the integrated feature map, and, at the step of (b), the learning device, if the number of channels of the first adjusted feature map is not a multiple of H2, instructs the second reshaping layer to add at least one second dummy channel to the first adjusted feature map such that the number of channels of the first adjusted feature map including the at least one second dummy channel is a multiple of H2, and to concatenate said each of features in said each group comprised of said each corresponding H2 channels among said all channels of the first adjusted feature map.

As one example, supposing that the number of the ROIs is N, and that a width of the pooled feature maps per each of the ROIs is M1 and a height thereof is M2, and that the number of channels of the pooled feature maps per each of the ROIs is J, at the step of (a), the learning device (i) instructs the first transposing layer to convert the pooled feature maps per each of the ROIs into the integrated feature map having a width of N, a height of 1, and a channel of M1·M2·J, or (ii) instructs the pooling layer to convert the pooled feature maps per each of the ROIs into the integrated feature map having the width of N, the height of 1, and the channel of M1·M2·J.

As one example, supposing that the number of filters in the 1×H1 convolutional layer is K, and that the number of filters in the 1×H2 convolutional layer is L, at the step of (b), the learning device instructs the first reshaping layer to generate the first reshaped feature map having a size of N×H1 with CEIL((M1·M2·J)/H1) channels, and instructs the 1×H1 convolutional layer to generate the first adjusted feature map having a volume of N·1·K resulting from a width of N, a height of 1, and a channel of K, and wherein the learning device instructs the second reshaping layer to generate the second reshaped feature map having the width of N, a height of H2, and a channel of CEIL(K/H2), and instructs the 1×H2 convolutional layer to generate the second adjusted feature map having a volume of N·1·L resulting from the width of N, the height of 1, and a channel of L.

As one example, at the step of (c), the learning device (i) instructs the second transposing layer to convert the second adjusted feature map into the pixel-wise feature maps per each of the ROIs having a volume of 1·1·L, resulting from a width of 1, a height of 1, and a channel of L, corresponding to each of N ROIs, or (ii) instructs the classifying layer to convert the second adjusted feature map into the pixel-wise feature maps per each of the ROIs having the volume of 1·1·L, resulting from the width of 1, the height of 1, and the channel of L, corresponding to each of the N ROIs.

As one example, the classifying layer uses at least a softmax algorithm.

For reference, in the description below, the phrase "for training" is added for terms related to the learning processes, and the phrase "for testing" is added for terms related to testing processes, to avoid possible confusion.

In accordance with another aspect of the present disclosure, there is provided a method for testing a CNN for image recognition, including steps of: (a) on condition that a learning device (1) (i) has instructed one or more convolutional layers to generate ROI feature maps for training per each of one or more ROIs for training, corresponding to one or more objects for training, by applying one or more convolution operations to each of ROI images for training generated by cropping and resizing areas of the ROIs for training on at least one training image, and (ii) (ii-1) has instructed a pooling layer to apply one or more pooling operations to the ROI feature maps for training, to thereby generate pooled feature maps for training per each of the ROIs for training, and has instructed a first transposing layer to concatenate each of pixels, per each of the ROIs for training, in each of corresponding same locations on the pooled feature maps for training per each of the ROIs for training, to thereby generate an integrated feature map for training, or (ii-2) has instructed the pooling layer to apply the pooling operations to the ROI feature maps for training, to thereby generate the pooled feature maps for training per each of the ROIs for training, and has instructed the pooling layer to concatenate each of the pixels, per each of the ROIs for training, in each of the corresponding same locations on the pooled feature maps for training per each of the ROIs for training, to thereby generate the integrated feature map for training, (2) (2-1) (i) has instructed a first reshaping layer to concatenate each of features in each group comprised of each corresponding H1 channels among all channels of the integrated feature map for training, to thereby generate a first reshaped feature map for training, and (ii) has instructed a 1×H1 convolutional layer to apply a 1×H1 convolution operation to the first reshaped feature map for training, to thereby generate a first adjusted feature map for training whose volume is adjusted, and (2-2) (i) has instructed a second reshaping layer to concatenate each of features in each group comprised of each corresponding H2 channels among all channels of the first adjusted feature map for training, to thereby generate a second reshaped feature map for training, and (ii) has instructed a 1×H2 convolutional layer to apply a 1×H2 convolution operation to the second reshaped feature map for training, to thereby generate a second adjusted feature map for training whose volume is adjusted, and (3) (3-1) (i) has instructed a second transposing layer to divide the second adjusted feature map for training by each of the pixels, to thereby generate pixel-wise feature maps for training per each of the ROIs for training, and has instructed a classifying layer to generate object information for training on each of the ROIs for training by using the pixel-wise feature maps for training per each of the ROIs for training, or (ii) has instructed the classifying layer to divide the second adjusted feature map for training by each of the pixels, to thereby generate the pixel-wise feature maps for training per each of the ROIs for training, and has instructed the classifying layer to generate the object information on each of the ROIs for training by using the pixel-wise feature maps for training per each of the ROIs for training, and (3-2) has instructed a loss layer to calculate one or more object losses by referring to the object information for training and its corresponding GT, to thereby learn at least part of parameters of the 1×H2 convolutional layer, the 1×H1 convolutional layer, and the convolutional layers by backpropagating the object losses; a testing device, if at least one test image is acquired, (i) instructing the convolutional layers to generate ROI feature maps for testing per each of one or more ROIs for testing, corresponding to one or more objects for testing, by applying the convolution operations to each of ROI images for testing generated by cropping and resizing areas of the ROIs for testing on the test image, and (ii) (ii-1) instructing the pooling layer to apply the pooling operations to the ROI feature maps for testing, to thereby generate pooled feature maps for testing per each of the ROIs for testing, and instructing the first transposing layer to concatenate each of pixels, per each of the ROIs for testing, in each of corresponding same locations on the pooled feature maps for testing per each of the ROIs for testing, to thereby generate an integrated feature map for testing, or (ii-2) instructing the pooling layer to apply the pooling operations to the ROI feature maps for testing, to thereby generate the pooled feature maps for testing per each of the ROIs for testing, and instructing the pooling layer to concatenate each of the pixels, per each of the ROIs for testing, in each of the corresponding same locations on the pooled feature maps for testing per each of the ROIs for testing, to thereby generate the integrated feature map for testing; (b) the testing device (b1) (i) instructing the first reshaping layer to concatenate each of features in each group comprised of each corresponding H1 channels among all channels of the integrated feature map for testing, to thereby generate a first reshaped feature map for testing, and (ii) instructing the 1×H1 convolutional layer to apply the 1×H1 convolution operation to the first reshaped feature map for testing, to thereby generate a first adjusted feature map for testing whose volume is adjusted, and (b2) (i) instructing the second reshaping layer to concatenate each of features in each group comprised of each corresponding H2 channels among all channels of the first adjusted feature map for testing, to thereby generate a second reshaped feature map for testing, and (ii) instructing the 1×H2 convolutional layer to apply the 1×H2 convolution operation to the second reshaped feature map for testing, to thereby generate a second adjusted feature map for testing whose volume is adjusted; and (c) the testing device (i) instructing the second transposing layer to divide the second adjusted feature map for testing by each of the pixels, to thereby generate pixel-wise feature maps for testing per each of the ROIs for testing, and instructing the classifying layer to generate object information for testing on each of the ROIs for testing by using the pixel-wise feature maps for testing per each of the ROIs for testing, or (ii) instructing the classifying layer to divide the second adjusted feature map for testing by each of the pixels, to thereby generate the pixel-wise feature maps for testing per each of the ROIs for testing, and instructing the classifying layer to generate the object information for testing on each of the ROIs for testing by using the pixel-wise feature maps for testing per each of the ROIs for testing.

As one example, at the step of (b), the testing device, if the number of channels of the integrated feature map for testing is not a multiple of H1, instructs the first reshaping layer to add at least one first dummy channel to the integrated feature map for testing such that the number of channels of the integrated feature map for testing including the at least one first dummy channel is a multiple of H1, and to concatenate said each of features in said each group comprised of said each corresponding H1 channels among said all channels of the integrated feature map for testing, and, at the step of (b), the testing device, if the number of channels of the first adjusted feature map for testing is not a multiple of H2, instructs the second reshaping layer to add at least one second dummy channel to the first adjusted feature map for testing such that the number of channels of the first adjusted feature map for testing including the at least one second dummy channel is a multiple of H2, and to concatenate said each of features in said each group comprised of said each corresponding H2 channels among said all channels of the first adjusted feature map for testing.

As one example, supposing that the number of the ROIs for testing is N, and that a width of the pooled feature maps for testing per each of the ROIs for testing is M1 and a height thereof is M2, and that the number of channels of the pooled feature maps for testing per each of the ROIs for testing is J, at the step of (a), the testing device (i) instructs the first transposing layer to convert the pooled feature maps for testing per each of the ROIs for testing into the integrated feature map for testing having a width of N, a height of 1, and a channel of M1·M2·J, or (ii) instructs the pooling layer to convert the pooled feature maps for testing per each of the ROIs for testing into the integrated feature map for testing having the width of N, the height of 1, and the channel of M1·M2·J.

As one example, supposing that the number of filters in the 1×H1 convolutional layer is K, and that the number of filters in the 1×H2 convolutional layer is L, at the step of (b), the testing device instructs the first reshaping layer to generate the first reshaped feature map for testing having a size of N×H1 with CEIL((M1·M2·J)/H1) channels, and instructs the 1×H1 convolutional layer to generate the first adjusted feature map for testing having a volume of N·1·K resulting from a width of N, a height of 1, and a channel of K, and wherein the testing device instructs the second reshaping layer to generate the second reshaped feature map for testing having the width of N, a height of H2, and a channel of CEIL(K/H2), and instructs the 1×H2 convolutional layer to generate the second adjusted feature map for testing having a volume of N·1·L resulting from the width of N, the height of 1, and a channel of L.

As one example, at the step of (c), the testing device (i) instructs the second transposing layer to convert the second adjusted feature map for testing into the pixel-wise feature maps for testing per each of the ROIs for testing having a volume of 1·1·L, resulting from a width of 1, a height of 1, and a channel of L, corresponding to each of N ROIs for testing, or (ii) instructs the classifying layer to convert the second adjusted feature map for testing into the pixel-wise feature maps for testing per each of the ROIs for testing having the volume of 1·1·L, resulting from the width of 1, the height of 1, and the channel of L, corresponding to each of the N ROIs for testing.

As one example, the classifying layer uses at least a softmax algorithm.

In accordance with still another aspect of the present disclosure, there is provided a learning device for learning parameters of a CNN for image recognition, including: at least one memory that stores instructions; and at least one processor configured to execute the instructions to: perform processes of (I) (i) instructing one or more convolutional layers to generate ROI feature maps per each of one or more ROIs, corresponding to one or more objects, by applying one or more convolution operations to each of ROI images generated by cropping and resizing areas of the ROIs on at least one training image, and (ii) (ii-1) instructing a pooling layer to apply one or more pooling operations to the ROI feature maps, to thereby generate pooled feature maps per each of the ROIs, and instructing a first transposing layer to concatenate each of pixels, per each of the ROIs, in each of corresponding same locations on the pooled feature maps per each of the ROIs, to thereby generate an integrated feature map, or (ii-2) instructing the pooling layer to apply the pooling operations to the ROI feature maps, to thereby generate the pooled feature maps per each of the ROIs, and instructing the pooling layer to concatenate each of the pixels, per each of the ROIs, in each of the corresponding same locations on the pooled feature maps per each of the ROIs, to thereby generate the integrated feature map, (II) (II-1) (i) instructing a first reshaping layer to concatenate each of features in each group comprised of each corresponding H1 channels among all channels of the integrated feature map, to thereby generate a first reshaped feature map, and (ii) instructing a 1×H1 convolutional layer to apply a 1×H1 convolution operation to the first reshaped feature map, to thereby generate a first adjusted feature map whose volume is adjusted, and (II-2) (i) instructing a second reshaping layer to concatenate each of features in each group comprised of each corresponding H2 channels among all channels of the first adjusted feature map, to thereby generate a second reshaped feature map, and (ii) instructing a 1×H2 convolutional layer to apply a 1×H2 convolution operation to the second reshaped feature map, to thereby generate a second adjusted feature map whose volume is adjusted, and (III) (III-1) (i) instructing a second transposing layer to divide the second adjusted feature map by each of the pixels, to thereby generate pixel-wise feature maps per each of the ROIs, and instructing a classifying layer to generate object information on each of the ROIs by using the pixel-wise feature maps per each of the ROIs, or (ii) instructing the classifying layer to divide the second adjusted feature map by each of the pixels, to thereby generate the pixel-wise feature maps per each of the ROIs, and instructing the classifying layer to generate the object information on each of the ROIs by using the pixel-wise feature maps per each of the ROIs, and (III-2) instructing a loss layer to calculate one or more object losses by referring to the object information and its corresponding GT, to thereby learn at least part of parameters of the 1×H2 convolutional layer, the 1×H1 convolutional layer, and the convolutional layers by backpropagating the object losses.

As one example, at the process of (II), the processor, if the number of channels of the integrated feature map is not a multiple of H1, instructs the first reshaping layer to add at least one first dummy channel to the integrated feature map such that the number of channels of the integrated feature map including the at least one first dummy channel is a multiple of H1, and to concatenate said each of features in said each group comprised of said each corresponding H1 channels among said all channels of the integrated feature map, and, at the process of (II), the processor, if the number of channels of the first adjusted feature map is not a multiple of H2, instructs the second reshaping layer to add at least one second dummy channel to the first adjusted feature map such that the number of channels of the first adjusted feature map including the at least one second dummy channel is a multiple of H2, and to concatenate said each of features in said each group comprised of said each corresponding H2 channels among said all channels of the first adjusted feature map.

As one example, supposing that the number of the ROIs is N, and that a width of the pooled feature maps per each of the ROIs is M1 and a height thereof is M2, and that the number of channels of the pooled feature maps per each of the ROIs is J, at the process of (I), the processor (i) instructs the first transposing layer to convert the pooled feature maps per each of the ROIs into the integrated feature map having a width of N, a height of 1, and a channel of M1·M2·J, or (ii) instructs the pooling layer to convert the pooled feature maps per each of the ROIs into the integrated feature map having the width of N, the height of 1, and the channel of M1·M2·J.

As one example, supposing that the number of filters in the 1×H1 convolutional layer is K, and that the number of filters in the 1×H2 convolutional layer is L, at the process of (II), the processor instructs the first reshaping layer to generate the first reshaped feature map having a size of N×H1 with CEIL((M1·M2·J)/H1) channels, and instructs the 1×H1 convolutional layer to generate the first adjusted feature map having a volume of N·1·K resulting from a width of N, a height of 1, and a channel of K, and wherein the processor instructs the second reshaping layer to generate the second reshaped feature map having the width of N, a height of H2, and a channel of CEIL(K/H2), and instructs the 1×H2 convolutional layer to generate the second adjusted feature map having a volume of N·1·L resulting from the width of N, the height of 1, and a channel of L.

As one example, at the process of (III), the processor (i) instructs the second transposing layer to convert the second adjusted feature map into the pixel-wise feature maps per each of the ROIs having a volume of 1·1·L, resulting from a width of 1, a height of 1, and a channel of L, corresponding to each of N ROIs, or (ii) instructs the classifying layer to convert the second adjusted feature map into the pixel-wise feature maps per each of the ROIs having the volume of 1·1·L, resulting from the width of 1, the height of 1, and the channel of L, corresponding to each of the N ROIs.

As one example, the classifying layer uses at least a softmax algorithm.

In accordance with still yet another aspect of the present disclosure, there is provided a testing device for testing a CNN for image recognition, including: at least one memory that stores instructions; and at least one processor, on condition that a learning device (1) (i) has instructed one or more convolutional layers to generate ROI feature maps for training per each of one or more ROIs for training, corresponding to one or more objects for training, by applying one or more convolution operations to each of ROI images for training generated by cropping and resizing areas of the ROIs for training on at least one training image, and (ii) (ii-1) has instructed a pooling layer to apply one or more pooling operations to the ROI feature maps for training, to thereby generate pooled feature maps for training per each of the ROIs for training, and has instructed a first transposing layer to concatenate each of pixels, per each of the ROIs for training, in each of corresponding same locations on the pooled feature maps for training per each of the ROIs for training, to thereby generate an integrated feature map for training, or (ii-2) has instructed the pooling layer to apply the pooling operations to the ROI feature maps for training, to thereby generate the pooled feature maps for training per each of the ROIs for training, and has instructed the pooling layer to concatenate each of the pixels, per each of the ROIs for training, in each of the corresponding same locations on the pooled feature maps for training per each of the ROIs for training, to thereby generate the integrated feature map for training, (2) (2-1) (i) has instructed a first reshaping layer to concatenate each of features in each group comprised of each corresponding H1 channels among all channels of the integrated feature map for training, to thereby generate a first reshaped feature map for training, and (ii) has instructed a 1×H1 convolutional layer to apply a 1×H1 convolution operation to the first reshaped feature map for training, to thereby generate a first adjusted feature map for training whose volume is adjusted, and (2-2) (i) has instructed a second reshaping layer to concatenate each of features in each group comprised of each corresponding H2 channels among all channels of the first adjusted feature map for training, to thereby generate a second reshaped feature map for training, and (ii) has instructed a 1×H2 convolutional layer to apply a 1×H2 convolution operation to the second reshaped feature map for training, to thereby generate a second adjusted feature map for training whose volume is adjusted, and (3) (3-1) (i) has instructed a second transposing layer to divide the second adjusted feature map for training by each of the pixels, to thereby generate pixel-wise feature maps for training per each of the ROIs for training, and has instructed a classifying layer to generate object information for training on each of the ROIs for training by using the pixel-wise feature maps for training per each of the ROIs for training, or (ii) has instructed the classifying layer to divide the second adjusted feature map for training by each of the pixels, to thereby generate the pixel-wise feature maps for training per each of the ROIs for training, and has instructed the classifying layer to generate the object information for training on each of the ROIs for training by using the pixel-wise feature maps for training per each of the ROIs for training, and (3-2) has instructed a loss layer to calculate one or more object losses by referring to the object information for training and its corresponding GT, to thereby learn at least part of parameters of the 1×H2 convolutional layer, the 1×H1 convolutional layer, and the convolutional layers by backpropagating the object losses; configured to execute the instructions to: perform processes of (I) (i) instructing the convolutional layers to generate ROI feature maps for testing per each of one or more ROIs for testing, corresponding to one or more objects for testing, by applying the convolution operations to each of ROI images for testing generated by cropping and resizing areas of the ROIs for testing on at least one test image, and (ii) (ii-1) instructing the pooling layer to apply the pooling operations to the ROI feature maps for testing, to thereby generate pooled feature maps for testing per each of the ROIs for testing, and instructing the first transposing layer to concatenate each of pixels, per each of the ROIs for testing, in each of corresponding same locations on the pooled feature maps for testing per each of the ROIs for testing, to thereby generate an integrated feature map for testing, or (ii-2) instructing the pooling layer to apply the pooling operations to the ROI feature maps for testing, to thereby generate the pooled feature maps for testing per each of the ROIs for testing, and instructing the pooling layer to concatenate each of the pixels, per each of the ROIs for testing, in each of the corresponding same locations on the pooled feature maps for testing per each of the ROIs for testing, to thereby generate the integrated feature map for testing, (II) (II-1) (i) instructing the first reshaping layer to concatenate each of features in each group comprised of each corresponding H1 channels among all channels of the integrated feature map for testing, to thereby generate a first reshaped feature map for testing, and (ii) instructing the 1×H1 convolutional layer to apply the 1×H1 convolution operation to the first reshaped feature map for testing, to thereby generate a first adjusted feature map for testing whose volume is adjusted, and (II-2) (i) instructing the second reshaping layer to concatenate each of features in each group comprised of each corresponding H2 channels among all channels of the first adjusted feature map for testing, to thereby generate a second reshaped feature map for testing, and (ii) instructing the 1×H2 convolutional layer to apply the 1×H2 convolution operation to the second reshaped feature map for testing, to thereby generate a second adjusted feature map for testing whose volume is adjusted, and (III) (i) instructing the second transposing layer to divide the second adjusted feature map for testing by each of the pixels, to thereby generate pixel-wise feature maps for testing per each of the ROIs for testing, and instructing the classifying layer to generate object information for testing on each of the ROIs for testing by using the pixel-wise feature maps for testing per each of the ROIs for testing, or (ii) instructing the classifying layer to divide the second adjusted feature map for testing by each of the pixels, to thereby generate the pixel-wise feature maps for testing per each of the ROIs for testing, and instructing the classifying layer to generate the object information for testing on each of the ROIs for testing by using the pixel-wise feature maps for testing per each of the ROIs for testing.

As one example, at the process of (II), the processor, if the number of channels of the integrated feature map for testing is not a multiple of H1, instructs the first reshaping layer to add at least one first dummy channel to the integrated feature map for testing such that the number of channels of the integrated feature map for testing including the at least one first dummy channel is a multiple of H1, and to concatenate said each of features in said each group comprised of said each corresponding H1 channels among said all channels of the integrated feature map for testing, and, at the process of (II), the processor, if the number of channels of the first adjusted feature map for testing is not a multiple of H2, instructs the second reshaping layer to add at least one second dummy channel to the first adjusted feature map for testing such that the number of channels, of the first adjusted feature map for testing including the at least one second dummy channel is a multiple of H2, and to concatenate said each of features in said each group comprised of said each corresponding H2 channels among said all channels of the first adjusted feature map for testing.

As one example, supposing that the number of the ROIs for testing is N, and that a width of the pooled feature maps for testing per each of the ROIs for testing is M1 and a height thereof is M2, and that the number of channels of the pooled feature maps for testing per each of the ROIs for testing is J, at the process of (I), the processor (i) instructs the first transposing layer to convert the pooled feature maps for testing per each of the ROIs for testing into the integrated feature map for testing having a width of N, a height of 1, and a channel of M1·M2·J, or (ii) instructs the pooling layer to convert the pooled feature maps for testing per each of the ROIs for testing into the integrated feature map for testing having the width of N, the height of 1, and the channel of M1·M2·J.

As one example, supposing that the number of filters in the 1×H1 convolutional layer is K, and that the number of filters in the 1×H2 convolutional layer is L, at the process of (II), the processor instructs the first reshaping layer to generate the first reshaped feature map for testing having a size of N×H1 with CEIL((M1·M2·J)/H1) channels, and instructs the 1×H1 convolutional layer to generate the first adjusted feature map for testing having a volume of N·1·K resulting from a width of N, a height of 1, and a channel of K, and wherein the processor instructs the second reshaping layer to generate the second reshaped feature map for testing having the width of N, a height of H2, and a channel of CEIL(K/H2), and instructs the 1×H2 convolutional layer to generate the second adjusted feature map for testing having a volume of N·1·L resulting from the width of N, the height of 1, and a channel of L.

As one example, at the process of (III), the processor (i) instructs the second transposing layer to convert the second adjusted feature map for testing into the pixel-wise feature maps for testing per each of the ROIs for testing having a volume of 1·1·L, resulting from a width of 1, a height of 1, and a channel of L, corresponding to each of N ROIs for testing, or (ii) instructs the classifying layer to convert the second adjusted feature map for testing into the pixel-wise feature maps for testing per each of the ROIs for testing having the volume of 1·1·L, resulting from the width of 1, the height of 1, and the channel of L, corresponding to each of the N ROIs for testing.

As one example, the classifying layer uses at least a softmax algorithm.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

FIG. 3 is a drawing schematically illustrating pooled feature maps per each of ROIs generated by a pooling layer, used for learning the CNN for image recognition in accordance with one example embodiment of the present disclosure.

FIGS. 5A and 5B are drawings schematically illustrating (i) a first reshaped feature map generated from reshaping the integrated feature map and (ii) a first adjusted feature map generated from applying a 1×H1 convolution operation to the first reshaped feature map, respectively, in accordance with one example embodiment of the present disclosure.

FIGS. 6A and 6B are drawings schematically illustrating (i) a second reshaped feature map generated from reshaping the first adjusted feature map and (ii) a second adjusted feature map generated from applying a 1×H2 convolution operation to the second reshaped feature map, respectively, in accordance with one example embodiment of the present disclosure.

DETAILED DESCRIPTION OF THE PREFERRED EMBODIMENTS

Figure 1:
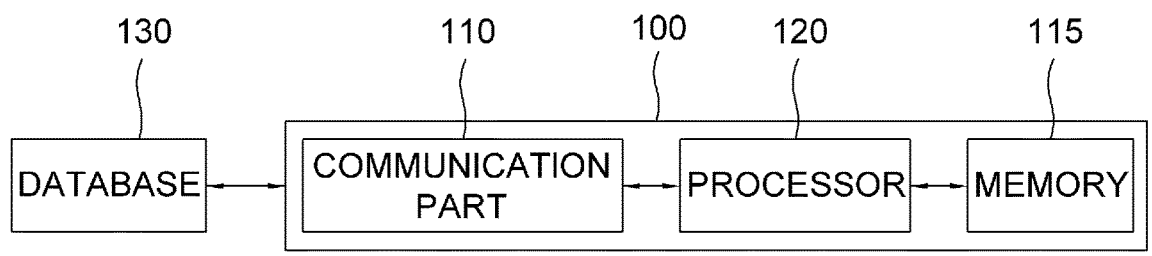
FIG. 1 is a drawing schematically illustrating a learning device for learning a CNN for image recognition in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a learning device 100 of a CNN for image recognition in accordance with one example embodiment of the present disclosure, and by referring to FIG. 1, the learning device 100 may include a communication part 110 and a processor 120.

First, the communication part 110 may receive at least one training image.

Herein, the training image may be stored in a database 300, and the database 300 may store at least one ground truth of class information on each of one or more objects and at least one ground truth of location information on each of the objects, corresponding to the training images.

In addition, the learning device may further include a memory 115 capable of storing computer readable instructions for performing following processes. As one example, the processor, the memory, a medium, etc. may be integrated with an integrated processor.

Next, the processor 120 may perform processes of (i) instructing one or more convolutional layers to generate ROI feature maps per each of one or more ROIs, corresponding to the objects, by applying one or more convolution operations to each of ROI images generated by cropping and resizing areas of the ROIs on the training image, and (ii) (ii-1) instructing a pooling layer to apply one or more pooling operations to the ROI feature maps, to thereby generate pooled feature maps per each of the ROIs, and instructing a first transposing layer to concatenate each of pixels, per each of the ROIs, in each of corresponding same locations on the pooled feature maps per each of the ROIs, to thereby generate an integrated feature map, or (ii-2) instructing the pooling layer to apply the pooling operations to the ROI feature maps, to thereby generate the pooled feature maps per each of the ROIs, and instructing the pooling layer to concatenate each of the pixels, per each of the ROIs, in each of the corresponding same locations on the pooled feature maps per each of the ROIs, to thereby generate the integrated feature map. Next, the processor 120 may perform processes of (i) instructing a first reshaping layer to concatenate each of features in each group comprised of each corresponding H1 channels among all channels of the integrated feature map, to thereby generate a first reshaped feature map, (ii) instructing a 1×H1 convolutional layer to apply a 1×H1 convolution operation to the first reshaped feature map, to thereby generate a first adjusted feature map whose volume is adjusted, (iii) instructing a second reshaping layer to concatenate each of features in each group comprised of each corresponding H2 channels among all channels of the first adjusted feature map, to thereby generate a second reshaped feature map, and (iv) instructing a 1×H2 convolutional layer to apply a 1×H2 convolution operation to the second reshaped feature map, to thereby generate a second adjusted feature map whose volume is adjusted. Then, the processor 120 may perform processes of (i) instructing a second transposing layer to divide the second adjusted feature map by each of the pixels, to thereby generate pixel-wise feature maps per each of the ROIs, and instructing a classifying layer to generate object information on each of the ROIs by using the pixel-wise feature maps per each of the ROIs, or (ii) instructing the classifying layer to divide the second adjusted feature map by each of the pixels, to thereby generate the pixel-wise feature maps per each of the ROIs, and instructing the classifying layer to generate the object information on each of the ROIs by using the pixel-wise feature maps per each of the ROIs. Then, the processor 120 may instruct a loss layer to calculate one or more object losses by referring to the object information and its corresponding GT, to thereby learn at least part of parameters of the 1×H2 convolutional layer, the 1×H1 convolutional layer, and the convolutional layers by backpropagating the object losses.

Herein, the learning device 100 in accordance with one example of the present disclosure may be a computing device and may be any digital device with a processor capable of computation. For reference, although FIG. 1 shows the single learning device 100, the scope of the present disclosure is not limited thereto. For example, the learning device may be configured as several devices to perform its functions.

Figure 2:
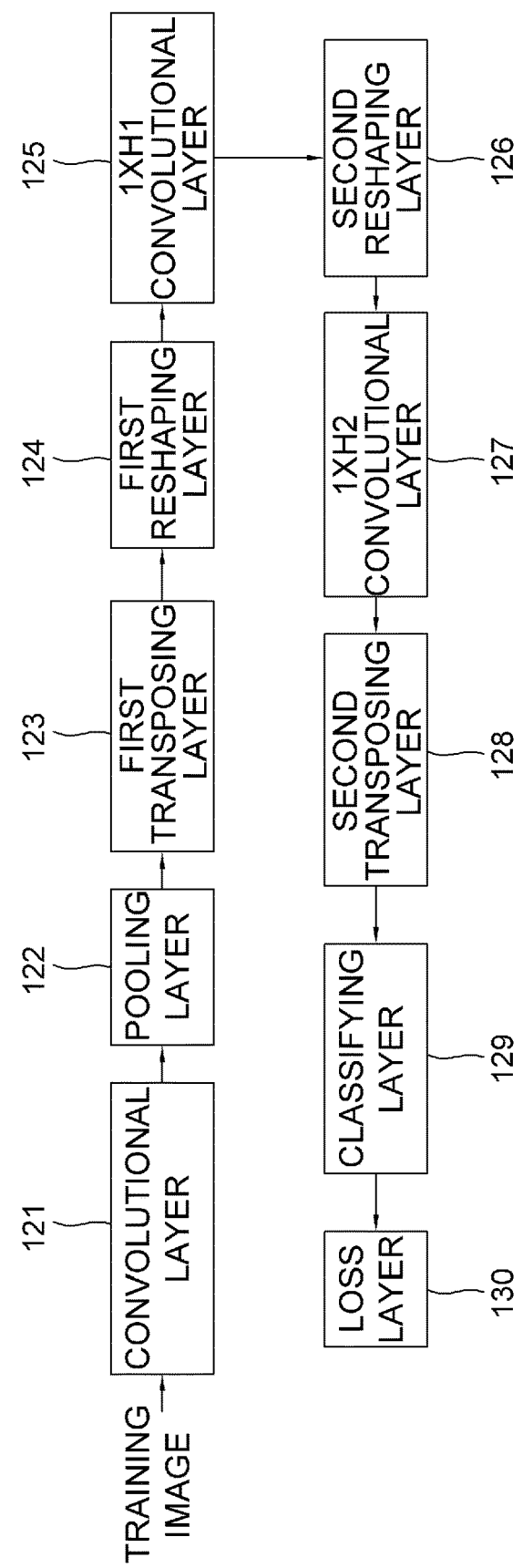
FIG. 2 is a drawing schematically illustrating a learning method for learning the CNN for image recognition in accordance with one example embodiment of the present disclosure.

A method for learning parameters of the CNN for image recognition by using the learning device 100 in accordance with one example embodiment of the present disclosure is described by referring to FIG. 2 as follows.

First of all, if the training image is inputted, the learning device 100 may instruct a convolutional layer 121 to generate ROI feature maps per each of one or more ROIs, corresponding to each of the objects, by applying the convolution operations to each of ROI images generated by cropping and resizing areas of the ROIs on the training image. Herein, the convolutional layer 121 may be a single convolutional layer or multiple convolutional layers for sequential convolution operations on the ROI images.

Then, the learning device 100 may instruct a pooling layer 122 to apply the pooling operations to the ROI feature maps per each of the ROIs, to thereby generate pooled feature maps P1, P2, . . . , and PN per each of the ROIs.

As one example, by referring to FIG. 3, supposing that the number of the ROIs is N, and that a width of the pooled feature maps P1, P2, . . . , and PN per each of the ROIs is M1 and a height thereof is M2, and that the number of channels of the pooled feature maps P1, P2, . . . , and PN per each of the ROIs is J, each of the pooled feature maps P1, P2, . . . , and PN per each of the ROIs may have a volume of M1·M2·J.

Then, the learning device 100 may instruct a first transposing layer 123 to concatenate each of pixels, per each of the ROIs, in each of corresponding same locations on the pooled feature maps P1, P2, . . . , and PN per each of the ROIs, outputted from the pooling layer 122, to thereby generate an integrated feature map 400.

Figure 4:
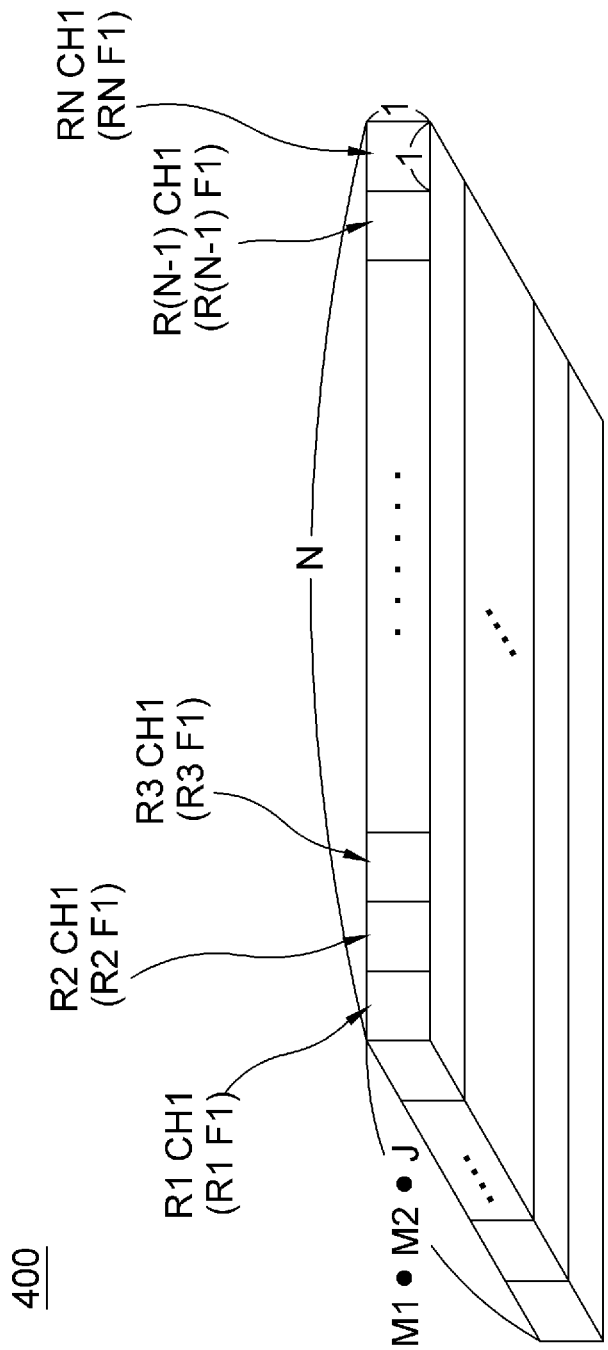
FIG. 4 is a drawing schematically illustrating an integrated feature map generated by using the pooled feature maps per each of the ROIs, used for learning the CNN for image recognition in accordance with one example embodiment of the present disclosure.

As one example, by referring to FIGS. 3 and 4, supposing that R1F1, R2F1, . . . , and RNF1 represent each of first pixels in each of the pooled feature maps P1, P2, . . . , and PN per each of the ROIs in FIG. 3, and R1F1, R2F1, . . . , and RNF1 may be concatenated such that a first part of the integrated feature map 400 having a width of N and a height of 1 is generated, shown as a line in the front corresponding to the first channel among all the channels in FIG. 4, and this process may be performed for the rest of the pixels in each of the pooled feature maps P1, P2, . . . , and PN per each of the ROIs. Next, the integrated feature map 400 may be generated as having channels of M1·M2·J which is equal to the number of the pixels in each of the pooled feature maps P1, P2, and PN per each of the ROIs.

As explained above, the learning device 100 may instruct the first transposing layer 123 to generate the integrated feature map 400 by using the pooled feature maps P1, P2, . . . , and PN per each of the ROIs outputted from the pooling layer 122. As another example, the learning device 100 may instruct the pooling layer 122 to generate the integrated feature map 400, without using the first transposing layer 123. That is, as another example, the learning device 100 may instruct the pooling layer 122 to apply the pooling operations to each region, corresponding to each of the ROIs, on the ROI feature maps per each of the ROIs, to thereby generate the pooled feature maps P1, P2, . . . , and PN per each of the ROIs, and to concatenate each of pixels, per each of the ROIs, in each of corresponding same locations on the pooled feature maps P1, P2, and PN per each of the ROIs, to thereby generate the integrated feature map 400.

Next, the learning device 100 may instruct a first reshaping layer 124 to concatenate each of features in each group comprised of each corresponding H1 channels among all channels of the integrated feature map 400, to thereby generate a first reshaped feature map 500A.

As one example, by referring to FIGS. 4 and 5A, the learning device 100 may instruct the first reshaping layer 124 to concatenate each of features R1CH1, R2CH1, . . . , and RNCH1 in a first channel of the integrated feature map 400 to R1CH(H1), R2CH(H1), . . . , and RNCH(H1) in an H1-th channel thereof, to concatenate each of features R1CH(H1+1), R2CH(H1+1), and RNCH(H1+1) in an (H1+1)-th channel of the integrated feature map 400 to R1CH(2·H1), R2CH(2·H1), and RNCH(2·H1) in a (2·H1)-th channel thereof, and the like. That is, the learning device 100 may repeat this concatenating process to generate the first reshaped feature map 500A having a width of N, a height of H1, and a channel of CEIL(M1·M2·J/H1).

Herein, if the number of the channels of the integrated feature map 400 is not a multiple of H1, the learning device 100 may instruct the first reshaping layer 124 to add at least one first dummy channel to the integrated feature map 400 such that the number of the channels of the integrated feature map 400 including the at least one first dummy channel is a multiple of H1, and to concatenate said each of features in said each group comprised of said each corresponding H1 channels among said all channels of the integrated feature map 400. That is, if the number of the channels of the integrated feature map 400 is not a multiple of H1 and thus a size of the integrated feature map 400, generated by concatenating a CEIL(M1·M2·J/H1)-th channel, does not equal to a size of a width of N and a height of H1, the at least one zero padding region may be added such that the integrated feature map 400 has a width of N and a height of H1.

Next, the learning device 100 may instruct a 1×H1 convolutional layer 125 to apply the 1×H1 convolution operation to the first reshaped feature map 500A, to thereby generate the first adjusted feature map 500B whose volume is adjusted.

As one example, by referring to FIGS. 5A and 5B, supposing that the number of filters in the 1×H1 convolutional layer 125 is K, the learning device 100 may instruct the 1×H1 convolutional layer 125 to apply the 1×H1 convolution operation to the first reshaped feature map 500A in FIG. 5A, to thereby generate the first adjusted feature map 500B having a volume of 11010K resulting from a width of N, a height of 1, and a channel of K. As a result, the amount of computation of the present disclosure becomes 1/H1 of that of the conventional art, thus processing time and performance may be improved.

Herein, features R1'CH1, R2'CH1, . . . , and RN'CH1 on the first adjusted feature map 500B may result from locally connecting features R1CH1, R1CH2, . . . , and R1CH(H1), locally connecting features R2CH1, R2CH2, . . . , and R2CH(H1), and locally connecting features RNCH1, RNCH2, . . . , and RNCH(H1) on the first reshaped feature map 500A. For reference, said "locally connecting" means applying the 1×H1 convolution operation.

Next, the learning device 100 may instruct a second reshaping layer 126 to concatenate each of features in each group comprised of each corresponding H2 channels among all channels of the first adjusted feature map 500B, to thereby generate a second reshaped feature map 600A.

Figure 6A:
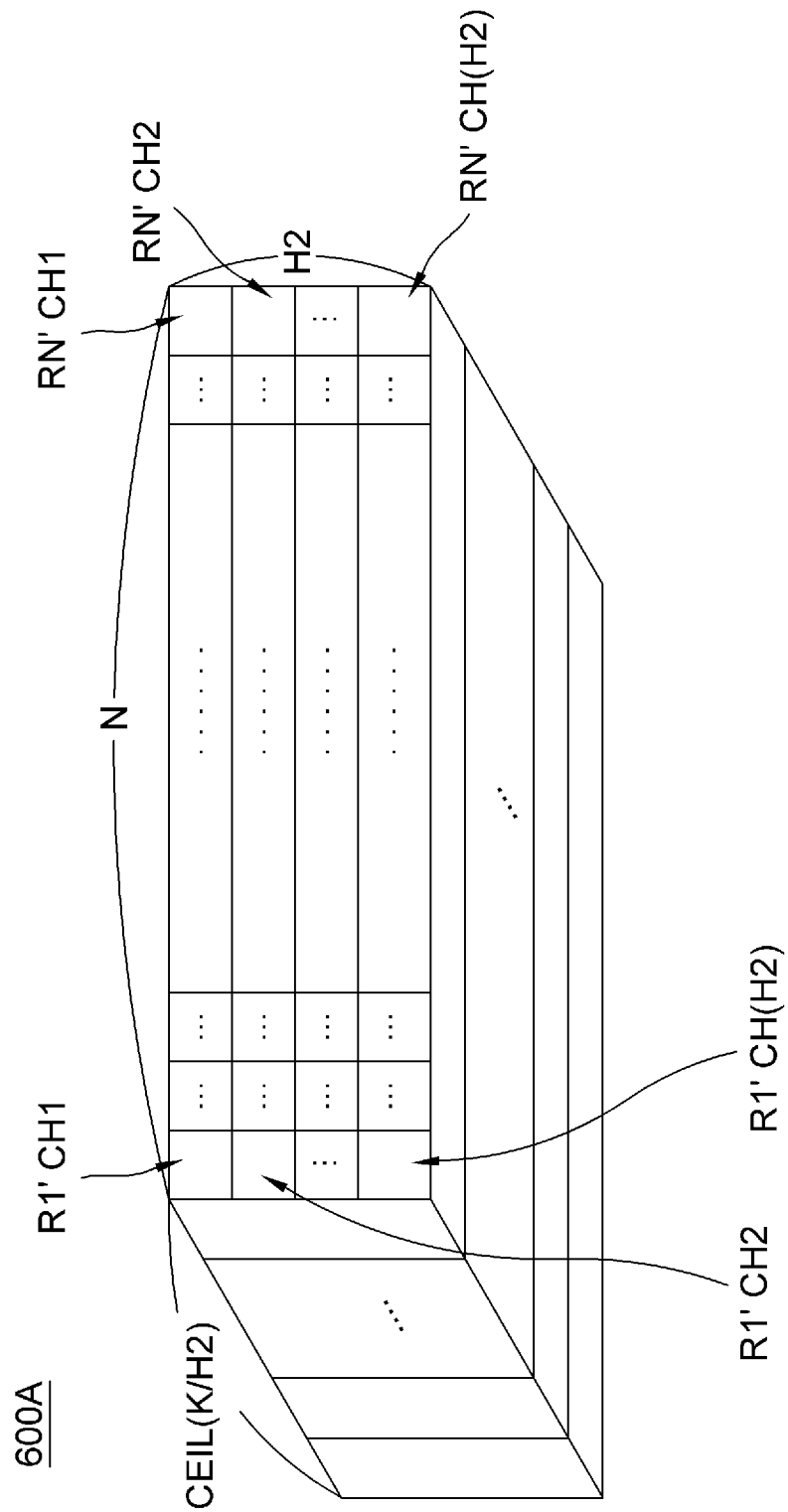

As one example, by referring to FIGS. 5B and 6A, the learning device 100 may instruct the second reshaping layer 126 to concatenate each of features R1'CH1, R2'CH1, . . . , and RN'CH1 in a first channel of the first adjusted feature map 500B to R1'CH(H1), R2'CH(H1), . . . , and RN'CH(H1) in an H2-th channel thereof, to concatenate each of features R1'CH(H1+1), R2'CH(H1+1), . . . , and RN'CH(H1+1) in an (H1+1)-th channel of the first adjusted feature map 500B to R1'CH(2·H1), R2'CH(2·H1), and RN'CH(2·H1) in a (2·H1)-th channel thereof, and the like. That is, the learning device 100 may repeat this concatenating process to generate the second reshaped feature map 600A having a width of N, a height of H2, and a channel of CEIL(K/H2).

Herein, if the number of the channels of the first adjusted feature map 500B is not a multiple of H2, the learning device 100 may instruct the second reshaping layer 126 to add at least one second dummy channel to the first adjusted feature map 500B such that the number of the channels of the first adjusted feature map 500B including the at least one second dummy channel is a multiple of H2, and to concatenate said each of features in said each group comprised of said each corresponding H2 channels among said all channels of the first adjusted feature map 500B. That is, if the number of the channels of the first adjusted feature map 500B is not a multiple of H2 and thus a size of the first adjusted feature map 500B, generated by concatenating a CEIL(K/H2)-th channel, does not equal to a size of a width of N and a height of H2, the at least one zero padding region may be added such that the first adjusted feature map 500B has a width of N and a height of H2.

Next, the learning device 100 may instruct a 1×H2 convolutional layer 127 to apply the 1×H2 convolution operation to the second reshaped feature map 600A, to thereby generate the second adjusted feature map 600B whose volume is adjusted.

As one example, by referring to FIGS. 6A and 6B, supposing that the number of filters in the 1×H2 convolutional layer 127 is L, the learning device 100 may instruct the 1×H2 convolutional layer 127 to apply the 1×H2 convolution operation to the second reshaped feature map 600A in FIG. 6A, to thereby generate the second adjusted feature map 600B having a volume of N·1·L resulting from a width of N, a height of 1, and a channel of L. As a result, the amount of computation of the present disclosure becomes 1/H2 of that of the conventional art, thus processing time and performance may be improved. Herein, features R1"CH1, R2"CH1, ..., and RN"CH1 on the second adjusted feature map 600B may result from locally connecting features R1'CH1, R1'CH2, ..., and R1'CH(H1), locally connecting features R2'CH1, R2'CH2, ..., and R2'CH(H1), ..., and locally connecting features RN'CH1, RN'CH2, ..., and RN'CH(H1) on the second reshaped feature map 600A. For reference, said "locally connecting" means applying the 1×H2 convolution operation.

Next, the learning device 100 may instruct a second transposing layer 128 to divide the second adjusted feature map 600B by each of the pixels, to thereby generate pixel-wise feature maps PW1, PW2, ..., and PWN per each of the ROIs.

Figure 7:
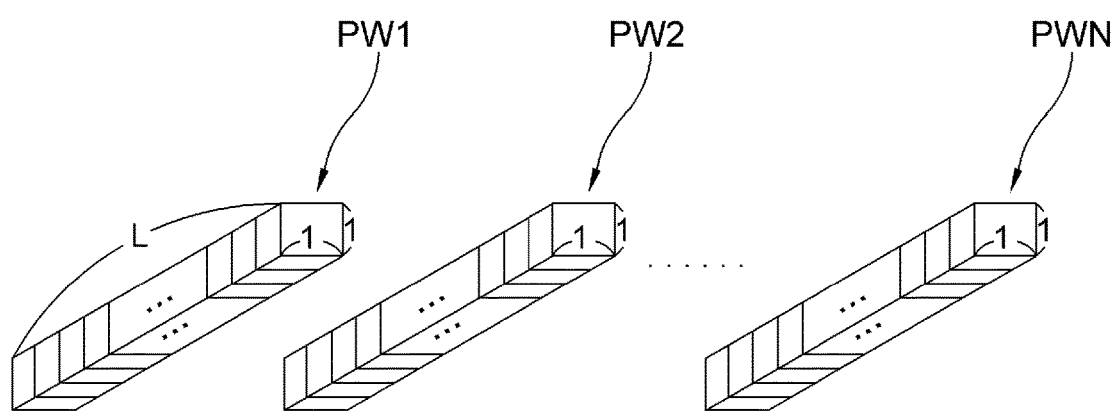
FIG. 7 is a drawing schematically illustrating pixel-wise feature maps per each of the ROIs generated by using the second adjusted feature map, used for learning the CNN for image recognition in accordance with one example embodiment of the present disclosure.

As one example, by referring to FIG. 7, the learning device 100 may instruct the second transposing layer 128 to divide the second adjusted feature map 600B having a volume of N·1·L resulting from a width of N, a height of 1, and a channel of L as in FIG. 6B, by each of the pixels, to thereby generate the pixel-wise feature maps PW1, PW2, ..., and PWN per each of the ROIs, having a width of 1, a height of 1, and a channel of L.

Next, the learning device 100 may instruct a classifying layer 129 to generate the object information on each of the ROIs by using the pixel-wise feature maps PW1, PW2, and PWN per each of the ROIs. Herein, the classifying layer 129 may use the softmax algorithm and may generate recognized results representing what each of the objects in each of the ROIs is estimated as, and may generate probability information on whether the recognized results are true. In addition, the object information may include location information of each of the objects on the training image.

As explained above, the second transposing layer 128 may generate the pixel-wise feature maps PW1, PW2, and PWN per each of the ROIs by using the second adjusted feature map 600B. As another example, the classifying layer 129 may generate the pixel-wise feature maps PW1, PW2, ..., and PWN per each of the ROIs by using the second adjusted feature map 600B, without using the second transposing layer 128. That is, as another example, the learning device 100 may instruct the classifying layer 129 to divide the second adjusted feature map 600B by each of the pixels, to thereby generate the pixel-wise feature maps PW1, PW2, and PWN per each of the ROIs, and may instruct the classifying layer 129 to generate the object information on each of the ROIs by using the pixel-wise feature maps PW1, PW2, ..., and PWN per each of the ROIs.

Then, the learning device 100 may instruct a loss layer 130 to calculate one or more object losses by referring to the object information and its corresponding GT, to thereby learn at least part of parameters of the 1×H2 convolutional layer 127, the 1×H1 convolutional layer 125, and the convolutional layer 121 by backpropagating the object losses.

The CNN for image recognition in accordance with one example embodiment of the present disclosure above is comprised of the convolutional layers only, and thus capable of recognizing the objects in the input image without regard to the size of the input image. Also, the CNN for image recognition in accordance with one example embodiment of the present disclosure is capable of reducing amount of computation by applying locally connected operation of the 1×H convolutional layer, compared to the fully connected operation of the conventional FC layers.

Figure 8:
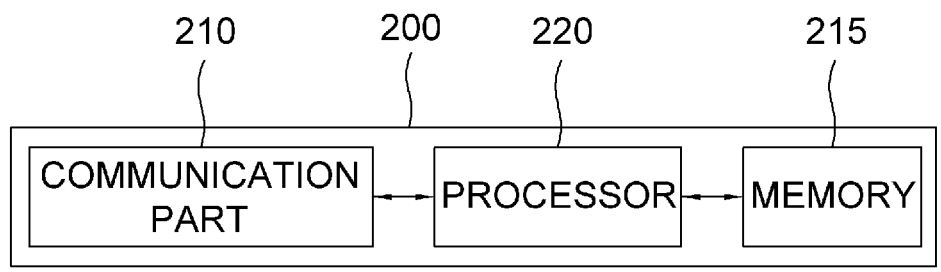
FIG. 8 is a drawing schematically illustrating a testing device for learning the CNN for image recognition in accordance with one example embodiment of the present disclosure.

FIG. 8 is a drawing schematically illustrating a testing device 200 of the CNN for image recognition in accordance with one example embodiment of the present disclosure, and by referring to FIG. 8, the testing device 200 may include a communication part 210 and a processor 220.

In addition, the testing device may further include a memory 215 capable of storing computer readable instructions for performing following processes. As one example, the processor, the memory, a medium, etc. may be integrated with an integrated processor.

First, the communication part 210 may acquire or support another device to acquire at least one test image.

Herein, the CNN for image recognition in accordance with one example of the present disclosure may be assumed to have been learned by the learning method described by referring to FIGS. 1 to 7.

For reference, in the description below, the phrase "for training" is added for terms related to the learning processes, and the phrase "for testing" is added for terms related to testing processes, to avoid possible confusion.

That is, if at least one training image has been acquired, the learning device may have performed processes of (a) (i) instructing the convolutional layers to generate ROI feature maps for training per each of one or more ROIs for training, corresponding to one or more objects for training, by applying the convolution operations to each of ROI images for training generated by cropping and resizing areas of the ROIs for training on the training image, and (ii) (ii-1) instructing the pooling layer to apply the pooling operations to the ROI feature maps for training, to thereby generate pooled feature maps for training per each of the ROIs for training, and instructing the first transposing layer to concatenate each of pixels, per each of the ROIs for training, in each of corresponding same locations on the pooled feature maps for training per each of the ROIs for training, to thereby generate an integrated feature map for training, or (ii-2) instructing the pooling layer to apply the pooling operations to the ROI feature maps for training, to thereby generate the pooled feature maps for training per each of the ROIs for training, and instructing the pooling layer to concatenate each of the pixels, per each of the ROIs for training, in each of the corresponding same locations on the pooled feature maps for training per each of the ROIs for training, to thereby generate the integrated feature map for training; (b) (b1) (i) instructing the first reshaping layer to concatenate each of features in each group comprised of each corresponding H1 channels among all channels of the integrated feature map for training, to thereby generate a first reshaped feature map for training, and (ii) instructing the 1×H1 convolutional layer to apply the 1×H1 convolution operation to the first reshaped feature map for training, to thereby generate a first adjusted feature map for training whose volume is adjusted, and (b2) (i) instructing the second reshaping layer to concatenate each of features in each group comprised of each corresponding H2 channels among all channels of the first adjusted feature map for training, to thereby generate a second reshaped feature map for training, and (ii) instructing the 1×H2 convolutional layer to apply the 1×H2 convolution operation to the second reshaped feature map for training, to thereby generate a second adjusted feature map for training whose volume is adjusted; and (c)

(c1) (i) instructing the second transposing layer to divide the second adjusted feature map for training by each of the pixels, to thereby generate pixel-wise feature maps for training per each of the ROIs for training, and instructing the classifying layer to generate object information for training on each of the ROIs for training by using the pixel-wise feature maps for training per each of the ROIs for training, or (ii) instructing the classifying layer to divide the second adjusted feature map for training by each of the pixels, to thereby generate the pixel-wise feature maps for training per each of the ROIs for training, and instructing the classifying layer to generate the object information for training on each of the ROIs for training by using the pixel-wise feature maps for training per each of the ROIs for training, and (c2) instructing the loss layer to calculate the object losses by referring to the object information for training and its corresponding GT, to thereby learn at least part of parameters of the 1×H2 convolutional layer, the 1×H1 convolutional layer, and the convolutional layers by backpropagating the object losses.

Next, the processor 220 may perform processes of (i) instructing the convolutional layers to generate ROI feature maps for testing per each of one or more ROIs for testing, corresponding to one or more objects for testing, by applying the convolution operations to each of ROI images for testing generated by cropping and resizing areas of the ROIs for testing on the test image, and (ii) (ii-1) instructing the pooling layer to apply the pooling operations to the ROI feature maps for testing, to thereby generate pooled feature maps for testing per each of the ROIs for testing, and instructing the first transposing layer to concatenate each of pixels, per each of the ROIs for testing, in each of corresponding same locations on the pooled feature maps for testing per each of the ROIs for testing, to thereby generate an integrated feature map for testing, or (ii-2) instructing the pooling layer to apply the pooling operations to the ROI feature maps for testing, to thereby generate the pooled feature maps for testing per each of the ROIs for testing, and instructing the pooling layer to concatenate each of the pixels, per each of the ROIs for testing, in each of the corresponding same locations on the pooled feature maps for testing per each of the ROIs for testing, to thereby generate the integrated feature map for testing. Then, the processor 220 may perform processes of (i) instructing the first reshaping layer to concatenate each of features in each group comprised of each corresponding H1 channels among all channels of the integrated feature map for testing, to thereby generate a first reshaped feature map for testing, (ii) instructing the 1×H1 convolutional layer to apply the 1×H1 convolution operation to the first reshaped feature map for testing, to thereby generate a first adjusted feature map for testing whose volume is adjusted, (iii) instructing the second reshaping layer to concatenate each of features in each group comprised of each corresponding H2 channels among all channels of the first adjusted feature map for testing, to thereby generate a second reshaped feature map for testing, and (iv) instructing the 1×H2 convolutional layer to apply the 1×H2 convolution operation to the second reshaped feature map for testing, to thereby generate a second adjusted feature map for testing whose volume is adjusted. Then, the processor 220 may perform processes of (i) instructing the second transposing layer to divide the second adjusted feature map for testing by each of the pixels, to thereby generate pixel-wise feature maps for testing per each of the ROIs for testing, and instructing the classifying layer to generate object information for testing on each of the ROIs for testing by using the pixel-wise feature maps for testing per each of the ROIs for testing, or (ii) instructing the classifying layer to divide the second adjusted feature map for testing by each of the pixels, to thereby generate the pixel-wise feature maps for testing per each of the ROIs for testing, and instructing the classifying layer to generate the object information for testing on each of the ROIs for testing by using the pixel-wise feature maps for testing per each of the ROIs for testing.

Herein, the testing device 200 in accordance with one example embodiment of the present disclosure may be a computing device and may be any device with a processor capable of computation. For reference, although FIG. 8 shows the single testing device 200, the scope of the present disclosure is not limited thereto. For example, the testing device may be configured as several devices to perform its functions.

Figure 9:
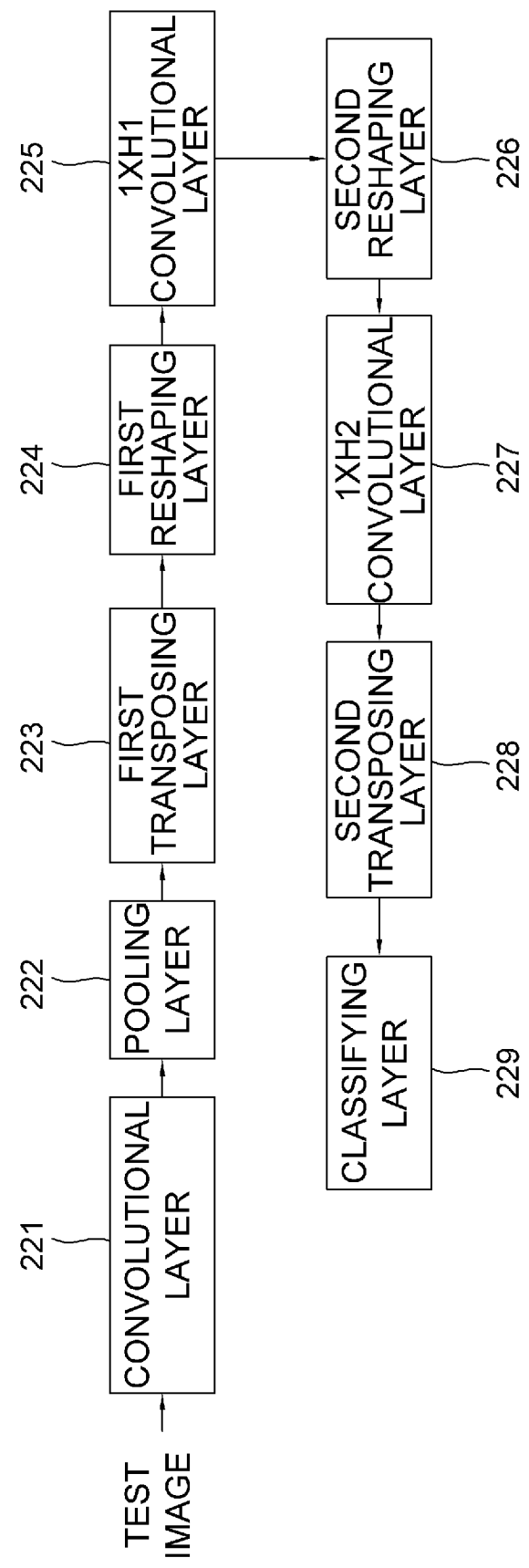
FIG. 9 is a drawing schematically illustrating a testing method for learning the CNN for image recognition in accordance with one example embodiment of the present disclosure.

A method for testing the CNN for image recognition by using the testing device 200 in accordance with one example embodiment of the present disclosure is described by referring to FIG. 9 as follows. In the description below, the part easily deducible from the learning method described by referring to FIGS. 1 to 7 will be omitted.

First, on condition that at least part of parameters of a convolutional layer 221, a 1×H1 convolutional layer 225, and a 1×H2 convolutional layer 227 has been learned according to the learning method described by referring to FIGS. 1 to 7, if the test image is inputted, the testing device 200 may instruct the convolutional layer 221 to apply the convolution operations to each of the ROI images for testing generated by cropping and resizing areas of the ROIs for testing, corresponding to the objects for testing, on the test image, to thereby generate the ROI feature maps for testing per each of the ROIs for testing. Herein, the convolutional layer 221 may be a single convolutional layer or multiple convolutional layers for sequential convolution operations on the ROI images for testing.

Then, the testing device 200 may instruct a pooling layer 222 to apply the pooling operations to the ROI feature maps for testing per each of the ROIs for testing, to thereby generate pooled feature maps for testing per each of the ROIs for testing.

Then, the testing device 200 may instruct the first transposing layer 223 to concatenate each of pixels, per each of the ROIs for testing, in each of corresponding same locations on the pooled feature maps for testing per each of the ROIs for testing, outputted from the pooling layer 222, to thereby generate an integrated feature map for testing.

As explained above, the testing device 200 may instruct the first transposing layer 223 to generate the integrated feature map for testing by using the pooled feature maps for testing per each of the ROIs for testing outputted from the pooling layer 222. As another example, the testing device 200 may instruct the pooling layer 222 to generate the integrated feature map for testing, without using the first transposing layer 223. That is, the learning device 200 may instruct the pooling layer 222 to apply the pooling operations to the ROI feature maps for testing per each of the ROIs for testing, to thereby generate the pooled feature maps for testing per each of the ROIs for testing, and to concatenate each of pixels, per each of the ROIs, in each of corresponding same locations on the pooled feature maps for testing per each of the ROIs for testing, to thereby generate the integrated feature map for testing.

Next, the testing device 200 may instruct a first reshaping layer 224 to concatenate each of features in each group comprised of each corresponding H1 channels among all channels of the integrated feature map for testing, to thereby generate a first reshaped feature map for testing.

Herein, if the number of the channels of the integrated feature map for testing is not a multiple of H1, the testing device 200 may instruct the first reshaping layer 224 to add at least one first dummy channel to the integrated feature map for testing such that the number of the channels of the integrated feature map for testing including the at least one first dummy channel is a multiple of H1, and to concatenate said each of features in said each group comprised of said each corresponding H1 channels among said all channels of the integrated feature map for testing. That is, if the number of the channels of the integrated feature map for testing is not a multiple of H1 and thus a size of the integrated feature map for testing, generated by concatenating a CEIL (M1·M2·J/H1)-th channel, does not equal to a size of a width of N and a height of H1, the at least one zero padding region may be added such that the integrated feature map for testing has a width of N and a height of H1.

Next, the testing device 200 may instruct a 1×H1 convolutional layer 225 to apply the 1×H1 convolution operation to the first reshaped feature map for testing, to thereby generate the first adjusted feature map for testing whose volume is adjusted.

Next, the testing device 200 may instruct a second reshaping layer 226 to concatenate each of features in each group comprised of each corresponding H2 channels among all channels of the first adjusted feature map for testing, to thereby generate a second reshaped feature map for testing.

Herein, if the number of the channels of the first adjusted feature map for testing is not a multiple of H2, the testing device 200 may instruct the second reshaping layer 226 to add at least one second dummy channel to the first adjusted feature map for testing such that the number of the channels of the first adjusted feature map for testing including the at least one second dummy channel is a multiple of H2, and to concatenate said each of features in said each group comprised of said each corresponding H2 channels among said all channels of the first adjusted feature map for testing. That is, if the number of the channels of the first adjusted feature map for testing is not a multiple of H2 and thus a size of the first adjusted feature map for testing, generated by concatenating a CEIL(K/H2)-th channel, does not equal to a size of a width of N and a height of H2, the at least one zero padding region may be added such that the first adjusted feature map for testing has a width of N and a height of H2.

Next, the testing device 200 may instruct a 1×H2 convolutional layer 227 to apply the 1×H2 convolution operation to the second reshaped feature map for testing, to thereby generate the second adjusted feature map for testing whose volume is adjusted.

Next, the testing device 200 may instruct a second transposing layer 228 to divide the second adjusted feature map for testing by each of the pixels, to thereby generate pixel-wise feature maps for testing per each of the ROIs for testing.

Next, the testing device 200 may instruct a classifying layer 229 to generate the object information for testing on each of the ROIS for testing by using the pixel-wise feature maps for testing per each of the ROIs for testing. Herein, the classifying layer 229 may use the softmax algorithm and may generate recognized results representing what each of the objects for testing in each of the ROIs for testing is estimated as, and may generate probability information on whether the recognized results are true. In addition, the object information for testing may include location information of each of the objects for testing on the test image.

As explained above, the second transposing layer 228 may generate the pixel-wise feature maps for testing per each of the ROIs for testing by using the second adjusted feature map for testing. As another example, the classifying layer 229 may generate the pixel-wise feature maps for testing per each of the ROIs for testing by using the second adjusted feature map for testing, without using the second transposing layer 228. That is, the testing device 200 may instruct the classifying layer 229 to divide the second adjusted feature map for testing by each of the pixels, to thereby generate the pixel-wise feature maps for testing per each of the ROIs for testing, and may instruct the classifying layer 229 to generate the object information for testing on each of the ROIs for testing by using the pixel-wise feature maps for testing per each of the ROIs for testing.

The above learning method and the testing method may be provided to be used for hardware optimization that satisfies KPI (key performance index).

The present disclosure has an effect of recognizing the objects in the input image without regard to the size of the input image by implementing the CNN for image recognition only with the convolutional layers.

The present disclosure has another effect of minimizing the number of weights used for feature classification by implementing the CNN for image recognition only with the convolutional layers, compared to a conventional case of using the FC layers.

The present disclosure has still another effect of reducing the amount of computation for the feature classification by implementing the CNN for image recognition only with the convolutional layers, compared to the conventional case of using the FC layers.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning parameters of a CNN for image recognition, comprising steps of:
(a) a learning device, if at least one training image is acquired, (i) instructing one or more convolutional layers to generate ROI feature maps per each of one or more ROIs, corresponding to one or more objects, by applying one or more convolution operations to each of ROI images generated by cropping and resizing areas of the ROIs on the training image, and (ii) (ii-1) instructing a pooling layer to apply one or more pooling operations to the ROI feature maps, to thereby generate pooled feature maps per each of the ROIs, and instructing a first transposing layer to concatenate each of pixels, per each of the ROIs, in each of corresponding same locations on the pooled feature maps per each of the ROIs, to thereby generate an integrated feature map, or (ii-2) instructing the pooling layer to apply the pooling operations to the ROI feature maps, to thereby generate the pooled feature maps per each of the ROIs, and instructing the pooling layer to concatenate each of the pixels, per each of the ROIs, in each of the corresponding same locations on the pooled feature maps per each of the ROIs, to thereby generate the integrated feature map;
(b) the learning device (b1) (i) instructing a first reshaping layer to concatenate each of features in each group comprised of each corresponding H1 channels among all channels of the integrated feature map, to thereby generate a first reshaped feature map, and (ii) instructing a 1×H1 convolutional layer to apply a 1×H1 convolution operation to the first reshaped feature map, to thereby generate a first adjusted feature map whose volume is adjusted, and (b2) (i) instructing a second reshaping layer to concatenate each of features in each group comprised of each corresponding H2 channels among all channels of the first adjusted feature map, to thereby generate a second reshaped feature map, and (ii) instructing a 1×H2 convolutional layer to apply a 1×H2 convolution operation to the second reshaped feature map, to thereby generate a second adjusted feature map whose volume is adjusted; and
(c) the learning device (c1) (i) instructing a second transposing layer to divide the second adjusted feature map by each of the pixels, to thereby generate pixel-wise feature maps per each of the ROIs, and instructing a classifying layer to generate object information on each of the ROIs by using the pixel-wise feature maps per each of the ROIs, or (ii) instructing the classifying layer to divide the second adjusted feature map by each of the pixels, to thereby generate the pixel-wise feature maps per each of the ROIs, and instructing the classifying layer to generate the object information on each of the ROIs by using the pixel-wise feature maps per each of the ROIs, and (c2) instructing a loss layer to calculate one or more object losses by referring to the object information and its corresponding GT, to thereby learn at least part of parameters of the 1×H2 convolutional layer, the 1×H1 convolutional layer, and the convolutional layers by backpropagating the object losses.

2. The method of claim 1, wherein, at the step of (b), the learning device, if the number of channels of the integrated feature map is not a multiple of H1, instructs the first reshaping layer to add at least one first dummy channel to the integrated feature map such that the number of channels of the integrated feature map including the at least one first dummy channel is a multiple of H1, and to concatenate said each of features in said each group comprised of said each corresponding H1 channels among said all channels of the integrated feature map, and
wherein, at the step of (b), the learning device, if the number of channels of the first adjusted feature map is not a multiple of H2, instructs the second reshaping layer to add at least one second dummy channel to the first adjusted feature map such that the number of channels of the first adjusted feature map including the at least one second dummy channel is a multiple of H2, and to concatenate said each of features in said each group comprised of said each corresponding H2 channels among said all channels of the first adjusted feature map.

3. The method of claim 1, wherein, supposing that the number of the ROIs is N, and that a width of the pooled feature maps per each of the ROIs is M1 and a height thereof is M2, and that the number of channels of the pooled feature maps per each of the ROIs is J, at the step of (a), the learning device (i) instructs the first transposing layer to convert the pooled feature maps per each of the ROIs into the integrated feature map having a width of N, a height of 1, and a channel of M1·M2·J, or (ii) instructs the pooling layer to convert the pooled feature maps per each of the ROIs into the integrated feature map having the width of N, the height of 1, and the channel of M1·M2·J.

4. The method of claim 3, wherein, supposing that the number of filters in the 1×H1 convolutional layer is K, and that the number of filters in the 1×H2 convolutional layer is L, at the step of (b), the learning device instructs the first reshaping layer to generate the first reshaped feature map having a size of N×H1 with CEIL(M1·M2·J/H1) channels, and instructs the 1×H1 convolutional layer to generate the first adjusted feature map having a volume of N·1·K resulting from a width of N, a height of 1, and a channel of K, and wherein the learning device instructs the second reshaping layer to generate the second reshaped feature map having the width of N, a height of H2, and a channel of CEIL(K/H2), and instructs the 1×H2 convolutional layer to generate the second adjusted feature map having a volume of N·1·L resulting from the width of N, the height of 1, and a channel of L.

5. The method of claim 4, wherein, at the step of (c), the learning device (i) instructs the second transposing layer to convert the second adjusted feature map into the pixel-wise feature maps per each of the ROIs having a volume of 1·1·L, resulting from a width of 1, a height of 1, and a channel of L, corresponding to each of N ROIs, or (ii) instructs the classifying layer to convert the second adjusted feature map into the pixel-wise feature maps per each of the ROIs having the volume of 1·1·L, resulting from the width of 1, the height of 1, and the channel of L, corresponding to each of the N ROIs.

6. The method of claim 1, wherein the classifying layer uses at least a softmax algorithm.

7. A method for testing a CNN for image recognition, comprising steps of:
(a) on condition that a learning device (1) (i) has instructed one or more convolutional layers to generate ROI feature maps for training per each of one or more ROIs for training, corresponding to one or more objects for training, by applying one or more convolution operations to each of ROI images for training generated by cropping and resizing areas of the ROIs for training on at least one training image, and (ii) (ii-1) has instructed a pooling layer to apply one or more pooling operations to the ROI feature maps for training, to thereby generate pooled feature maps for training per each of the ROIs for training, and has instructed a first transposing layer to concatenate each of pixels, per each of the ROIs for training, in each of corresponding same locations on the pooled feature maps for training per each of the ROIs for training, to thereby generate an integrated feature map for training, or (ii-2) has instructed the pooling layer to apply the pooling operations to the ROI feature maps for training, to thereby generate the pooled feature maps for training per each of the ROIs for training, and has instructed the pooling layer to concatenate each of the pixels, per each of the ROIs for training, in each of the corresponding same locations on the pooled feature maps for training per each of the ROIs for training, to thereby generate the integrated feature map for training, (2) (2-1) (i) has instructed a first reshaping layer to concatenate each of features in each group comprised of each corresponding H1 channels among all channels of the integrated feature map for training, to thereby generate a first reshaped feature map for training, and (ii) has instructed a 1×H1 convolutional layer to apply a 1×H1 convolution operation to the first reshaped feature map for training, to thereby generate a first adjusted feature map for training whose volume is adjusted, and (2-2) (i) has instructed a second reshaping layer to concatenate each of features in each group comprised of each corresponding H2 channels among all channels of the first adjusted feature map for training, to thereby generate a second reshaped feature map for training, and (ii) has instructed a 1×H2 convolutional layer to apply a 1×H2 convolution operation to the second reshaped feature map for training, to thereby generate a second adjusted feature map for training whose volume is adjusted, and (3) (3-1) (i) has instructed a second transposing layer to divide the second adjusted feature map for training by each of the pixels, to thereby generate pixel-wise feature maps for training per each of the ROIs for training, and has instructed a classifying layer to generate object information for training on each of the ROIs for training by using the pixel-wise feature maps for training per each of the ROIs for training, or (ii) has instructed the classifying layer to divide the second adjusted feature map for training by each of the pixels, to thereby generate the pixel-wise feature maps for training per each of the ROIs for training, and has instructed the classifying layer to generate the object information for training on each of the ROIs for training by using the pixel-wise feature maps for training per each of the ROIs for training, and (3-2) has instructed a loss layer to calculate one or more object losses by referring to the object information for training and its corresponding GT, to thereby learn at least part of parameters of the 1×H2 convolutional layer, the 1×H1 convolutional layer, and the convolutional layers by backpropagating the object losses; a testing device, if at least one test image is acquired, (i) instructing the convolutional layers to generate ROI feature maps for testing per each of one or more ROIs for testing, corresponding to one or more objects for testing, by applying the convolution operations to each of ROI images for testing generated by cropping and resizing areas of the ROIs for testing on the test image, and (ii) (ii-1) instructing the pooling layer to apply the pooling operations to the ROI feature maps for testing, to thereby generate pooled feature maps for testing per each of the ROIs for testing, and instructing the first transposing layer to concatenate each of pixels, per each of the ROIs for testing, in each of corresponding same locations on the pooled feature maps for testing per each of the ROIs for testing, to thereby generate an integrated feature map for testing, or (ii-2) instructing the pooling layer to apply the pooling operations to the ROI feature maps for testing, to thereby generate the pooled feature maps for testing per each of the ROIs for testing, and instructing the pooling layer to concatenate each of the pixels, per each of the ROIs for testing, in each of the corresponding same locations on the pooled feature maps for testing per each of the ROIs for testing, to thereby generate the integrated feature map for testing;

(b) the testing device (b1) (i) instructing the first reshaping layer to concatenate each of features in each group comprised of each corresponding H1 channels among all channels of the integrated feature map for testing, to thereby generate a first reshaped feature map for testing, and (ii) instructing the 1×H1 convolutional layer to apply the 1×H1 convolution operation to the first reshaped feature map for testing, to thereby generate a first adjusted feature map for testing whose volume is adjusted, and (b2) (i) instructing the second reshaping layer to concatenate each of features in each group comprised of each corresponding H2 channels among all channels of the first adjusted feature map for testing, to thereby generate a second reshaped feature map for testing, and (ii) instructing the 1×H2 convolutional layer to apply the 1×H2 convolution operation to the second reshaped feature map for testing, to thereby generate a second adjusted feature map for testing whose volume is adjusted; and (c) the testing device (i) instructing the second transposing layer to divide the second adjusted feature map for testing by each of the pixels, to thereby generate pixel-wise feature maps for testing per each of the ROIs for testing, and instructing the classifying layer to generate object information for testing on each of the ROIs for testing by using the pixel-wise feature maps for testing per each of the ROIs for testing, or (ii) instructing the classifying layer to divide the second adjusted feature map for testing by each of the pixels, to thereby generate the pixel-wise feature maps for testing per each of the ROIs for testing, and instructing the classifying layer to generate the object information for testing on each of the ROIs for testing by using the pixel-wise feature maps for testing per each of the ROIs for testing.

8. The method of claim 7, wherein, at the step of (b), the testing device, if the number of channels of the integrated feature map for testing is not a multiple of H1, instructs the first reshaping layer to add at least one first dummy channel to the integrated feature map for testing such that the number of channels of the integrated feature map for testing including the at least one first dummy channel is a multiple of H1, and to concatenate said each of features in said each group comprised of said each corresponding H1 channels among said all channels of the integrated feature map for testing, and wherein, at the step of (b), the testing device, if the number of channels of the first adjusted feature map for testing is not a multiple of H2, instructs the second reshaping layer to add at least one second dummy channel to the first adjusted feature map for testing such that the number of channels of the first adjusted feature map for testing including the at least one second dummy channel is a multiple of H2, and to concatenate said each of features in said each group comprised of said each corresponding H2 channels among said all channels of the first adjusted feature map for testing.

9. The method of claim 7, wherein, supposing that the number of the ROIs for testing is N, and that a width of the pooled feature maps for testing per each of the ROIs for testing is M1 and a height thereof is M2, and that the number of channels of the pooled feature maps for testing per each of the ROIs for testing is J, at the step of (a), the testing device (i) instructs the first transposing layer to convert the pooled feature maps for testing per each of the ROIs for testing into the integrated feature map for testing having a width of N, a height of 1, and a channel of M1·M2·J, or (ii) instructs the pooling layer to convert the pooled feature maps for testing per each of the ROIs for testing into the integrated feature map for testing having the width of N, the height of 1, and the channel of M1·M2·J.

10. The method of claim 9, wherein, supposing that the number of filters in the 1×H1 convolutional layer is K, and that the number of filters in the 1×H2 convolutional layer is L, at the step of (b), the testing device instructs the first reshaping layer to generate the first reshaped feature map for testing having a size of N×H1 with CEIL((M1·M2·J)/H1) channels, and instructs the 1×H1 convolutional layer to generate the first adjusted feature map for testing having a volume of N·1·K resulting from a width of N, a height of 1, and a channel of K, and wherein the testing device instructs the second reshaping layer to generate the second reshaped feature map for testing having the width of N, a height of H2, and a channel of CEIL(K/H2), and instructs the 1×H2 convolutional layer to generate the second adjusted feature map for testing having a volume of N·1·L resulting from the width of N, the height of 1, and a channel of L.

11. The method of claim 10, wherein, at the step of (c), the testing device (i) instructs the second transposing layer to convert the second adjusted feature map for testing into the pixel-wise feature maps for testing per each of the ROIs for testing having a volume of 1·1·L, resulting from a width of 1, a height of 1, and a channel of L, corresponding to each of N ROIs for testing, or (ii) instructs the classifying layer to convert the second adjusted feature map for testing into the pixel-wise feature maps for testing per each of the ROIs for testing having the volume of 1·1·L, resulting from the width of 1, the height of 1, and the channel of L, corresponding to each of the N ROIs for testing.

12. The method of claim 7, wherein the classifying layer uses at least a softmax algorithm.

13. A learning device for learning parameters of a CNN for image recognition, comprising:
at least one memory that stores instructions; and
at least one processor configured to execute the instructions to: perform processes of (I) (i) instructing one or more convolutional layers to generate ROI feature maps per each of one or more ROIs, corresponding to one or more objects, by applying one or more convolution operations to each of ROI images generated by cropping and resizing areas of the ROIs on at least one training image, and (ii) (ii-1) instructing a pooling layer to apply one or more pooling operations to the ROI feature maps, to thereby generate pooled feature maps per each of the ROIs, and instructing a first transposing layer to concatenate each of pixels, per each of the ROIs, in each of corresponding same locations on the pooled feature maps per each of the ROIs, to thereby generate an integrated feature map, or (ii-2) instructing the pooling layer to apply the pooling operations to the ROI feature maps, to thereby generate the pooled feature maps per each of the ROIs, and instructing the pooling layer to concatenate each of the pixels, per each of the ROIs, in each of the corresponding same locations on the pooled feature maps per each of the ROIs, to thereby generate the integrated feature map, (II) (II-1) (i) instructing a first reshaping layer to concatenate each of features in each group comprised of each corresponding H1 channels among all channels of the integrated feature map, to thereby generate a first reshaped feature map, and (ii) instructing a 1×H1 convolutional layer to apply a 1×H1 convolution operation to the first reshaped feature map, to thereby generate a first adjusted feature map whose volume is adjusted, and (II-2) (i) instructing a second reshaping layer to concatenate each of features in each group comprised of each corresponding H2 channels among all channels of the first adjusted feature map, to thereby generate a second reshaped feature map, and (ii) instructing a 1×H2 convolutional layer to apply a 1×H2 convolution operation to the second reshaped feature map, to thereby generate a second adjusted feature map whose volume is adjusted, and (III) (III-1) (i) instructing a second transposing layer to divide the second adjusted feature map by each of the pixels, to thereby generate pixel-wise feature maps per each of the ROIs, and instructing a classifying layer to generate object information on each of the ROIs by using the pixel-wise feature maps per each of the ROIs, or (ii) instructing the classifying layer to divide the second adjusted feature map by each of the pixels, to thereby generate the pixel-wise feature maps per each of the ROIs, and instructing the classifying layer to generate the object information on each of the ROIs by using the pixel-wise feature maps per each of the ROIs, and (III-2) instructing a loss layer to calculate one or more object losses by referring to the object information and its corresponding GT, to thereby learn at least part of parameters of the 1×H2 convolutional layer, the 1×H1 convolutional layer, and the convolutional layers by backpropagating the object losses.

14. The learning device of claim 13, wherein, at the process of (II), the processor, if the number of channels of the integrated feature map is not a multiple of H1, instructs the first reshaping layer to add at least one first dummy channel to the integrated feature map such that the number of channels of the integrated feature map including the at least one first dummy channel is a multiple of H1, and to concatenate said each of features in said each group comprised of said each corresponding H1 channels among said all channels of the integrated feature map, and
wherein, at the process of (II), the processor, if the number of channels of the first adjusted feature map is not a multiple of H2, instructs the second reshaping layer to add at least one second dummy channel to the first adjusted feature map such that the number of channels of the first adjusted feature map including the at least one second dummy channel is a multiple of H2, and to concatenate said each of features in said each group comprised of said each corresponding H2 channels among said all channels of the first adjusted feature map.

15. The learning device of claim 13, wherein, supposing that the number of the ROIs is N, and that a width of the pooled feature maps per each of the ROIs is M1 and a height thereof is M2, and that the number of channels of the pooled feature maps per each of the ROIs is J, at the process of (I), the processor (i) instructs the first transposing layer to convert the pooled feature maps per each of the ROIs into the integrated feature map having a width of N, a height of 1, and a channel of M1·M2·J, or (ii) instructs the pooling layer to convert the pooled feature maps per each of the ROIs into the integrated feature map having the width of N, the height of 1, and the channel of M1·M2·J.

16. The learning device of claim 15, wherein, supposing that the number of filters in the 1×H1 convolutional layer is K, and that the number of filters in the 1×H2 convolutional layer is L, at the process of (II), the processor instructs the first reshaping layer to generate the first reshaped feature map having a size of N×H1 with CEIL((M1·M2·J)/H1) channels, and instructs the 1×H1 convolutional layer to generate the first adjusted feature map having a volume of N·1·K resulting from a width of N, a height of 1, and a channel of K, and wherein the processor instructs the second reshaping layer to generate the second reshaped feature map having the width of N, a height of H2, and a channel of CEIL(K/H2), and instructs the 1×H2 convolutional layer to generate the second adjusted feature map having a volume of N·1·L resulting from the width of N, the height of 1, and a channel of L.

17. The learning device of claim 16, wherein, at the process of (III), the processor (i) instructs the second transposing layer to convert the second adjusted feature map into the pixel-wise feature maps per each of the ROIs having a volume of 1·1·L, resulting from a width of 1, a height of 1, and a channel of L, corresponding to each of N ROIs, or (ii) instructs the classifying layer to convert the second adjusted feature map into the pixel-wise feature maps per each of the ROIs having the volume of 1·1·L, resulting from the width of 1, the height of 1, and the channel of L, corresponding to each of the N ROIs.

18. The learning device of claim 13, wherein the classifying layer uses at least a softmax algorithm.

19. A testing device for testing a CNN for image recognition, comprising:
at least one memory that stores instructions; and
at least one processor, on condition that a learning device (1) (i) has instructed one or more convolutional layers to generate ROI feature maps for training per each of one or more ROIs for training, corresponding to one or more objects for training, by applying one or more convolution operations to each of ROI images for training generated by cropping and resizing areas of the ROIs for training on at least one training image, and (ii) (ii-1) has instructed a pooling layer to apply one or more pooling operations to the ROI feature maps for training, to thereby generate pooled feature maps for training per each of the ROIs for training, and has instructed a first transposing layer to concatenate each of pixels, per each of the ROIs for training, in each of corresponding same locations on the pooled feature maps for training per each of the ROIs for training, to thereby generate an integrated feature map for training, or (ii-2) has instructed the pooling layer to apply the pooling operations to the ROI feature maps for training, to thereby generate the pooled feature maps for training per each of the ROIs for training, and has instructed the pooling layer to concatenate each of the pixels, per each of the ROIs for training, in each of the corresponding same locations on the pooled feature maps for training per each of the ROIs for training, to thereby generate the integrated feature map for training, (2) (2-1) (i) has instructed a first reshaping layer to concatenate each of features in each group comprised of each corresponding H1 channels among all channels of the integrated feature map for training, to thereby generate a first reshaped feature map for training, and (ii) has instructed a 1×H1 convolutional layer to apply a 1×H1 convolution operation to the first reshaped feature map for training, to thereby generate a first adjusted feature map for training whose volume is adjusted, and (2-2) (i) has instructed a second reshaping layer to concatenate each of features in each group comprised of each corresponding H2 channels among all channels of the first adjusted feature map for training, to thereby generate a second reshaped feature map for training, and (ii) has instructed a 1×H2 convolutional layer to apply a 1×H2 convolution operation to the second reshaped feature map for training, to thereby generate a second adjusted feature map for training whose volume is adjusted, and (3) (3-1) (i) has instructed a second transposing layer to divide the second adjusted feature map for training by each of the pixels, to thereby generate pixel-wise feature maps for training per each of the ROIs for training, and has instructed a classifying layer to generate object information for training on each of the ROIs for training by using the pixel-wise feature maps for training per each of the ROIs for training, or (ii) has instructed the classifying layer to divide the second adjusted feature map for training by each of the pixels, to thereby generate the pixel-wise feature maps for training per each of the ROIs for training, and has instructed the classifying layer to generate the object information for training on each of the ROIs for training by using the pixel-wise feature maps for training per each of the ROIs for training, and (3-2) has instructed a loss layer to calculate one or more object losses by referring to the object information for training and its corresponding GT, to thereby learn at least part of parameters of the 1×H2 convolutional layer, the 1×H1 convolutional layer, and the convolutional layers by backpropagating the object losses; configured to execute the instructions to: perform processes of (I) (i) instructing the convolutional layers to generate ROI feature maps for testing per each of one or more ROIs for testing, corresponding to one or more objects for testing, by applying the convolution operations to each of ROI images for testing generated by cropping and resizing areas of the ROIs for testing on at least one test image, and (ii) (ii-1) instructing the pooling layer to apply the pooling operations to the ROI feature maps for testing, to thereby generate pooled feature maps for testing per each of the ROIs for testing, and instructing the first transposing layer to concatenate each of pixels, per each of the ROIs for testing, in each of corresponding same locations on the pooled feature maps for testing per each of the ROIs for testing, to thereby generate an integrated feature map for testing, or (ii-2) instructing the pooling layer to apply the pooling operations to the ROI feature maps for testing, to thereby generate the pooled feature maps for testing per each of the ROIs for testing, and instructing the pooling layer to concatenate each of the pixels, per each of the ROIs for testing, in each of the corresponding same locations on the pooled feature maps for testing per each of the ROIs for testing, to thereby generate the integrated feature map for testing, (II) (II-1) (i) instructing the first reshaping layer to concatenate each of features in each group comprised of each corresponding H1 channels among all channels of the integrated feature map for testing, to thereby generate a first reshaped feature map for testing, and (ii) instructing the 1×H1 convolutional layer to apply the 1×H1 convolution operation to the first reshaped feature map for testing, to thereby generate a first adjusted feature map for testing whose volume is adjusted, and (II-2) (i) instructing the second reshaping layer to concatenate each of features in each group comprised of each corresponding H2 channels among all channels of the first adjusted feature map for testing, to thereby generate a second reshaped feature map for testing, and (ii) instructing the 1×H2 convolutional layer to apply the 1×H2 convolution operation to the second reshaped feature map for testing, to thereby generate a second adjusted feature map for testing whose volume is adjusted, and (III) (i) instructing the second transposing layer to divide the second adjusted feature map for testing by each of the pixels, to thereby generate pixel-wise feature maps for testing per each of the ROIs for testing, and instructing the classifying layer to generate object information for testing on each of the ROIs for testing by using the pixel-wise feature maps for testing per each of the ROIs for testing, or (ii) instructing the classifying layer to divide the second adjusted feature map for testing by each of the pixels, to thereby generate the pixel-wise feature maps for testing per each of the ROIs for testing, and instructing the classifying layer to generate the object information for testing on each of the ROIs for testing by using the pixel-wise feature maps for testing per each of the ROIs for testing.

20. The testing device of claim 19, wherein, at the process of (II), the processor, if the number of channels of the integrated feature map for testing is not a multiple of H1, instructs the first reshaping layer to add at least one first dummy channel to the integrated feature map for testing such that the number of channels of the integrated feature map for testing including the at least one first dummy channel is a multiple of H1, and to concatenate said each of features in said each group comprised of said each corresponding H1 channels among said all channels of the integrated feature map for testing, and wherein, at the process of (II), the processor, if the number of channels of the first adjusted feature map for testing is not a multiple of H2, instructs the second reshaping layer to add at least one second dummy channel to the first adjusted feature map for testing such that the number of channels of the first adjusted feature map for testing including the at least one second dummy channel is a multiple of H2, and to concatenate said each of features in said each group comprised of said each corresponding H2 channels among said all channels of the first adjusted feature map for testing.

21. The testing device of claim 19, wherein, supposing that the number of the ROIs for testing is N, and that a width of the pooled feature maps for testing per each of the ROIs for testing is M1 and a height thereof is M2, and that the number of channels of the pooled feature maps for testing per each of the ROIs for testing is J, at the process of (I), the processor (i) instructs the first transposing layer to convert the pooled feature maps for testing per each of the ROIs for testing into the integrated feature map for testing having a width of N, a height of 1, and a channel of M1·M2·J, or (ii) instructs the pooling layer to convert the pooled feature maps for testing per each of the ROIs for testing into the integrated feature map for testing having the width of N, the height of 1, and the channel of M1·M2·J.

22. The testing device of claim 21, wherein, supposing that the number of filters in the 1×H1 convolutional layer is K, and that the number of filters in the 1×H2 convolutional layer is L, at the process of (II), the processor instructs the first reshaping layer to generate the first reshaped feature map for testing having a size of N×H1 with CEIL((M1·M2·J)/H1) channels, and instructs the 1×H1 convolutional layer to generate the first adjusted feature map for testing having a volume of N·1·K resulting from a width of N, a height of 1, and a channel of K, and wherein the processor instructs the second reshaping layer to generate the second reshaped feature map for testing having the width of N, a height of H2, and a channel of CEIL(K/H2), and instructs the 1×H2 convolutional layer to generate the second adjusted feature map for testing having a volume of N·1·L resulting from the width of N, the height of 1, and a channel of L.

23. The testing device of claim 22, wherein, at the process of (III), the processor (i) instructs the second transposing layer to convert the second adjusted feature map for testing into the pixel-wise feature maps for testing per each of the ROIs for testing having a volume of 1·1·L, resulting from a width of 1, a height of 1, and a channel of L, corresponding to each of N ROIs for testing, or (ii) instructs the classifying layer to convert the second adjusted feature map for testing into the pixel-wise feature maps for testing per each of the ROIs for testing having the volume of 1·1·L, resulting from the width of 1, the height of 1, and the channel of L, corresponding to each of the N ROIs for testing.

24. The testing device of claim 19, wherein the classifying layer uses at least a softmax algorithm.

* * * * *